US007647066B2

(12) United States Patent
Takahashi et al.

(10) Patent No.: US 7,647,066 B2
(45) Date of Patent: Jan. 12, 2010

(54) TRANSMISSION POWER CONTROL METHOD AND APPARATUS FOR MOBILE COMMUNICATION SYSTEM

(75) Inventors: Mamoru Takahashi, Kawasaki (JP); Yoshikazu Nakano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/203,265

(22) Filed: Sep. 3, 2008

(65) Prior Publication Data

US 2009/0011771 A1 Jan. 8, 2009

Related U.S. Application Data

(62) Division of application No. 10/968,366, filed on Oct. 19, 2004, now Pat. No. 7,436,794.

(30) Foreign Application Priority Data

Oct. 20, 2003 (JP) ............................. 2003-359250

(51) Int. Cl.
*H04B 7/00* (2006.01)

(52) U.S. Cl. ................................... 455/522; 455/452.2

(58) Field of Classification Search .............. 455/452.2, 455/561, 522
See application file for complete search history.

(56) References Cited

U.S. PATENT DOCUMENTS 5,838,671 A 11/1998 Ishikawa et al.

(Continued)

FOREIGN PATENT DOCUMENTS

EP 1 139 685 10/2001

(Continued)

OTHER PUBLICATIONS

"Universal mobile telecommunications system (UMTS), Physical layer procedures (FDD) (3GPP TS 25.214 Version 3.4.0 Release 1999)", ETSI TS 125 214, (Sep. 1, 2000), pp. 1-48, European Telecommunications Standards Institute, France.

(Continued)

*Primary Examiner*—David Q Nguyen
(74) *Attorney, Agent, or Firm*—Katten Muchin Rosenman LLP

(57) ABSTRACT

A transmission power control apparatus is adapted to control a reference value for controlling a transmission power of a mobile terminal equipment based on a reception quality of a plurality of radio access bearers at a base station apparatus, with respect to a physical channel to which the plurality of radio access bearers are mapped, when making a radio connection between the mobile terminal equipment and the base station apparatus in a mobile communication system. The transmission power control apparatus includes a judging part configured to judge whether or not a radio access bearer that is a monitoring target of the reception quality is an audio transmission radio access bearer in a silent state, based on multiplexed information; and a switching part configured to switch the radio access bearer that is the monitoring target of the reception quality to a radio access bearer other than the audio transmission radio access bearer in the silent state, if the judging part judges that the radio access bearer than is the monitoring target of the reception quality is the audio transmission radio access bearer in the silent state. The reference value for controlling the transmission power of the mobile terminal equipment is controlled based on a reception quality of the radio access bearer other than the audio transmission radio access bearer in the silent state.

4 Claims, 20 Drawing Sheets

U.S. PATENT DOCUMENTS

| | | |
|---|---|---|
| 6,173,162 B1 | 1/2001 | Dahlman et al. |
| 6,950,632 B1 | 9/2005 | Yun et al. |
| 7,203,510 B2 * | 4/2007 | Tanoue ................ 455/522 |
| 2003/0036403 A1 | 2/2003 | Shiu et al. |
| 2003/0045319 A1 | 3/2003 | Sarkar et al. |
| 2003/0171118 A1 | 9/2003 | Miya |
| 2004/0243712 A1 | 12/2004 | Sakai et al. |
| 2005/0048937 A1 | 3/2005 | Sarkar et al. |
| 2006/0040698 A1 | 2/2006 | Shiu et al. |
| 2008/0233995 A1 | 9/2008 | Shiu et al. |

FOREIGN PATENT DOCUMENTS

| | | |
|---|---|---|
| EP | 1311076 A1 * | 5/2003 |
| JP | 2001-217770 | 8/2001 |
| JP | 2001-285193 | 10/2001 |
| JP | 2003-018089 | 1/2003 |
| WO | 9847253 | 10/1998 |
| WO | 9858461 | 12/1998 |
| WO | 0074289 | 12/2000 |
| WO | 02102109 | 12/2002 |
| WO | 03017527 | 2/2003 |
| WO | 03021807 | 3/2003 |

OTHER PUBLICATIONS

Partial European Search Report and Annex to the European Search Report, dated Mar. 27, 2009, for corresponding European Patent Application EP 04 25 6435.

European Search Report dated Jun. 12, 2009, from the corresponding European Application.

* cited by examiner

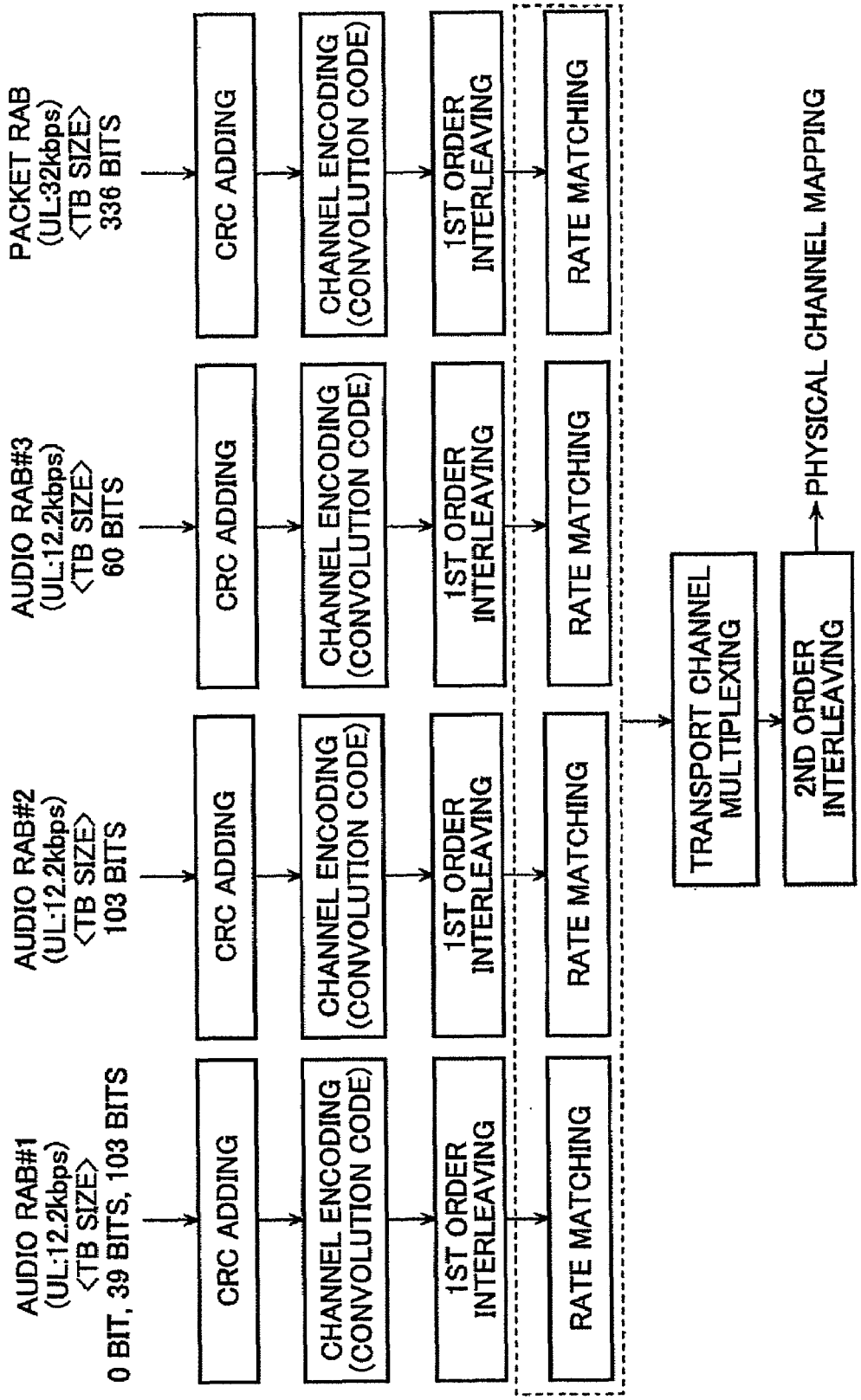

FIG.4A RELATED ART

|  | TFI=0 | TFI=1 | TFI=2 |
|---|---|---|---|
| AUDIO RAB#1 (UL:12.2kbps) | 0 BIT × 1 | 39 BITS × 1 | 81 BITS × 1 |
| AUDIO RAB#2 (UL:12.2kbps) | 103 BITS × 0 | 103 BITS × 1 | — |
| AUDIO RAB#3 (UL:12.2kbps) | 60 BITS × 0 | 60 BITS × 1 | — |
| PACKET RAB (UL:32kbps) | 336 BITS × 0 | 336 BITS × 1 | 336 BITS × 2 |

FIG.4B RELATED ART

|  | TFCI=$C_0$ | TFCI=$C_1$ | TFCI=$C_2$ | TFCI=$C_3$ | TFCI=$C_4$ | TFCI=$C_5$ | TFCI=$C_6$ | TFCI=$C_7$ | TFCI=$C_8$ |
|---|---|---|---|---|---|---|---|---|---|
| AUDIO RAB#1 (UL:12.2kbps) | TFI=0 | TFI=1 | TFI=2 | TFI=0 | TFI=1 | TFI=2 | TFI=0 | TFI=1 | TFI=2 |
| AUDIO RAB#2 (UL:12.2kbps) | TFI=0 | TFI=0 | TFI=1 | TFI=0 | TFI=0 | TFI=1 | TFI=0 | TFI=0 | TFI=1 |
| AUDIO RAB#3 (UL:12.2kbps) | TFI=0 | TFI=0 | TFI=1 | TFI=0 | TFI=0 | TFI=1 | TFI=0 | TFI=0 | TFI=1 |
| PACKET RAB (UL:32kbps) | TFI=0 | TFI=0 | TFI=0 | TFI=1 | TFI=1 | TFI=1 | TFI=2 | TFI=2 | TFI=2 |

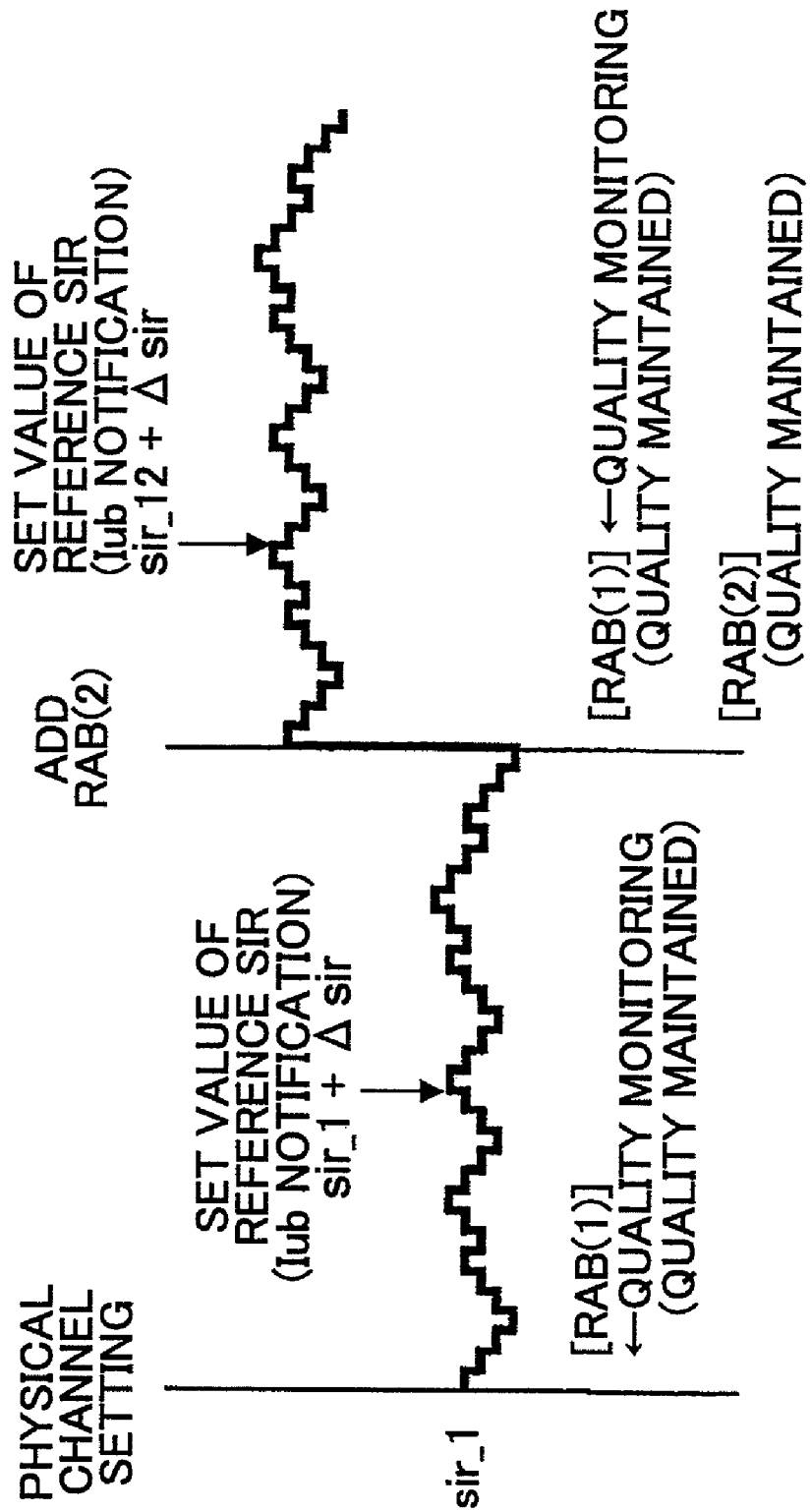

TRANSMISSION POWER CONTROL METHOD AND APPARATUS FOR MOBILE COMMUNICATION SYSTEM

This application is a divisional application of and claims priority to U.S. Ser. No. 10/968,366 which was filed on Oct. 19, 2004 and which is now pending. U.S. Ser. No. 10/968,366 claims the benefit of a Japanese Patent Application No. 2003-359250 filed Oct. 20, 2003, in the Japanese Patent Office, the disclosure of which is hereby incorporated by reference.

BACKGROUND OF THE INVENTION

1. Field of the Invention

The present invention generally relates to transmission power control methods and apparatuses for mobile communication systems, and more particularly to a transmission power control method and an apparatus for controlling a transmission power of a mobile terminal equipment (UE) based on a wave reception quality at a base station apparatus (Node-B) when making a radio connection between the mobile terminal equipment (UE) and the base station apparatus (Node-B) in a mobile communication system employing Code Division Multiple Access (CDMA).

2. Description of the Related Art

A description will be given of an up-link transmission power control based on Signal-power-to-Interference-power Ratio (SIR) in CDMA, by referring to FIG. 1. In the CDMA, the wave that is transmitted on the up-link after being subjected to a spectrum spreading process in a mobile terminal equipment UE, is subjected to a despreading process and a demodulation process by Rake combining in a base station apparatus Node-B so as to detect the desired wave.

Reception powers of the desired wave and the interference wave are measured after the despreading and the Rake combining, and a measured value SIR_mes of a power relative value of the desired wave with respect to the interference wave is calculated. In order to maintain reception quality, a reference SIR value SIR_tag is set in the base station apparatus Node-B for each physical channel. A received SIR value SIR_mes obtained for each slot is compared with the reference SIR value SIR_tag, and a comparison result is reflected to power control information bits (TPC) that are transmitted to the mobile terminal equipment UE. The mobile terminal equipment UE uses the received power control information bits (TPC) to vary an up-link transmission power level to the base station apparatus Node-B.

The base station apparatus Node-B carries out an inner loop transmission power control with respect to the mobile terminal equipment EU. For example, in a case where the received SIR value SIR_mes in the base station apparatus Node-B is smaller than the reference SIR value SIR_tag, the base station apparatus Node-B uses the power control information bits (TPC) and controls the transmission power of the mobile terminal equipment EU so as to increase. On the other hand, in a case where the received SIR value SIR_mes in the base station apparatus Node-B is larger than the reference SIR value SIR_tag, the base station apparatus Node-B uses the power control information bits (TPC) and controls the transmission power of the mobile terminal equipment EU so as to decrease. The far-and-near problem between the base station apparatus Node-B and the mobile terminal equipment UE is solved by performing this inner loop transmission power control.

In the up-link power control, there is a demand to maintain the reception quality constant regardless of the propagation environment and the moving velocity of the mobile terminal equipment UE. For this reason, an outer loop transmission power control is employed to control the set value of the reference SIR value SIR_tag for maintaining the reception quality constant, from a radio network control apparatus RNC with respect to the base station apparatus Node-B.

The radio network control apparatus RNC monitors the reception quality of the up-link in the base station apparatus Node-B for every predetermined period, and changes the set value of the reference SIR value SIR_tag using the information that is obtained as a result of the monitoring. In a case where the reception quality at the base station apparatus Node-B has not reached a target quality, the radio network control apparatus RNC changes the set value of the reference SIR value SIR_tag to a higher value. On the other hand, in a case where the reception quality at the base station apparatus Node-B has exceeded the target quality, the radio network control apparatus RNC changes the set value of the reference SIR value SIR_tag to a lower value. The radio network control apparatus RNC carries out the outer loop transmission power control in this manner.

Evaluation parameters that are used for the reception quality include Quality Estimate (QE) and Cyclic Redundancy Check Indicator (CRCI). FIGS. 2A and 2B respectively are diagrams for explaining control of the reference SIR value SIR_tag when the QE and the RCI are used for the reception quality.

In the base station apparatus Node-B shown in FIG. 2A, a Bit Error Rate (BIR) is measured when carrying out a decoding (error correction) process with respect to the received signal from the mobile terminal equipment UE, and the QE is calculated from the measured BER. The value QE_cal of the calculated QE is notified to the radio network control apparatus RNC as the reception quality.

A target QE value QE_req is set in the radio network control apparatus RNC for each Radio Access Bearer RAB, and the radio network control apparatus RNC compares the received QE value QE_cal and the target QE value QE_req. The radio network control apparatus RNC decreases the reference SIR value that is presently set if the received QE value QE_cal is larger than the target QE value QE_req as a result of the comparison, and increases the reference SIR value that is presently set if the received QE value QE_cal is smaller than the target QE value QE_req as a result of the comparison. The reference SIR value that is set is updated in this manner.

The updated reference SIR value is notified to the base station apparatus Node-B by a signal transmitting and receiving interface Iub between the radio network control apparatus RNC and the base station apparatus Node-B. The base station apparatus Node-B sets the notified updated reference SIR value as the reference SIR value SIR_tag.

In the base station apparatus Node-B shown in FIG. 2B, a reception error is detected from Cyclic Redundancy Check (CRC) bits of a transport block in units of Transport Time Intervals (TTIs) when carrying out a decoding (error correction) process with respect to the received signal from the mobile terminal equipment UE. A detection result of the reception error is notified to the radio network control apparatus RNC as the Cyclic Redundancy Check Indicator (CRCI).

The radio network control apparatus RNC updates the reference SIR value by decreasing the reference SIR value if the notified CRCI indicates "normal reception (OK)" and increasing the reference SIR value if the notified CRCI indicates "reception error (NG)". The updated reference SIR value is notified from the signal transmitting and receiving interface Iub to the base station apparatus Node-B, and set as the reference SIR value SIR_tag for the base station apparatus Node-B.

One value is set for the up-link reference SIR value with respect to each physical channel. When carrying out the outer loop control in a case where a plurality of transport channels (for example, audio services, data services and the like) are mapped in one physical channel (for example, channels with identical frequency and spread code), the radio network control apparatus RNC monitors the reception quality of a single transport channel of the plurality of transport channels, and reference SIR value SIR_tag is controlled by reflecting the information that is obtained by the monitoring of the reception quality. The reference SIR value SIR_tag is increased or decreased depending on whether or not the CRC or QE value for the measured transport channel that has reached a target value.

An International Publication Number No. 98/47253 proposes a CDMA communication method that improves the utilization efficiency of frequency resources and the communication quality, by increasing the transmission power in only a single a specified physical channel and transmitting control information (pilot symbol and TPC symbol) in multicode transmission.

A Japanese Laid-Open Patent Application No. 2001-217770 proposes a transmission power control that avoids mismatch of the outer loop controls before and after a handover connection.

A Japanese Laid-Open Patent Application No. 2001-285193 proposes an outer loop transmission power control that maintains a desired communication quality in each of a plurality of channels even in a case where the transmission control information from the base station to the mobile station is made up of only one bit.

A Japanese Laid-Open Patent Application No. 2003-18089 proposes a radio communication apparatus that maintains the reception quality to a desired quality regardless of a magnitude of the change in the propagation environment when carrying out the outer loop transmission power control.

Next, a description will be given of the problems to be solved when the audio is switched from a voiced state to a silent state.

FIG. 3 is a diagram showing coding and multiplexing schemes for the up-link when carrying out a multi-call transmission of packet channels (Interactive or Background/UL: 32 kbps/Packet Switching Radio Access Bearer (RAB)) and audio channels (Conversational/Speech/UL:12.2 kbps/Circuit Switching RAB) by Adaptive Multi-Rate (AMR) coding.

Three radio access bearers RAB#1, RAB#2 and RAB#3 are prescribed for the audio transmission, and the number of kinds of transport block (TB) sizes is one (0 bit, 39 bits and 81 bits) for the radio access bearer RAB#1, one (103 bits) for the radio access bearer RAB#2, and one (60 bits) for the radio access bearer RAB#3. The 0-bit transport block (TB) of the radio access bearer RAB#1 is transmitted even in a state (silent state) where there are no data bits to be transmitted, and the CRC bits are transmitted according to the transport block (TB) that is transmitted.

A single radio access bearer (RAB) is used when making a packet transmission, and the number of kinds of transport block (TB) sizes is one (336 bits). At each radio access bearer (RAB), the number of transport blocks (TBs) transmitted during the TTI and the transport block (TB) size are indicated by the value of a Transport Format Indicator (TFI). Further, the value of a Transport Format Combination Indicator (TFCI) is allocated with respect to a combination of the Transport Format Indicators (TFIs) of the radio access bearers (RABs) that are mapped when carrying out the multiplexing. Multiplexed information of a plurality of channels (for example, the numbers of transport blocks (TBs), the transport block (TB) size and the like) in a single physical channel will simply be referred to as "multiplexed information".

When carrying out the multi-call transmission of the audio transmission (up-line, 12.2 kbps) and the packet transmission (up line, 32 kbps), the Transport Format Indicator (TFI) and the Transport Format Combination Indicator (TFCI) are respectively allocated as shown in FIGS. 4A and 4B.

As may be seen from FIG. 4B, there are nine Transport Format Combination Indicators (TFCIs) C0 through C8.

The Transport Format Combination Indicators (TFCIs) are transmitted from the mobile terminal equipment UE to the base station apparatus Node-B in a state mapped on the physical channel. The base station apparatus Node-B detects the transport format from the received Transport Format Combination Indicator (TFCI), so as to carry out the decoding process and a separation process to make a separation into the transport blocks (TBs) of each of the radio access bearers (RABs).

When the audio transport channels of the up-link are mapped on the physical channel in the mobile terminal equipment UE, a convolution encoder (constraint length 9, code rate 1/3) shown in FIG. 5A is used, but the coding efficiency changes depending on the number of data bits. A number of bits, Y, after the encoding can be described by the following formula, where X denotes a number of data bits of the code block that is input to the convolution encoder, C denotes a number of CRC bits that are added, T denotes a number of tail bits added to the end of the code block before the encoding. For example, T=8 bits and the value of all of the 8 bits are fixed to 0.

$Y=(X+C+T)\times 3$

An encoding gain $K_X$ in this case can be described by the following formula.

$K_X=\{(X+C+T)\times 3\}/(X+C)$

In a silent state where X=0, an encoding gain $K_0$ can be described by the following formula.

$K_0=\{(C+T)\times 3\}/C$

In the radio access bearer RAB#1, C is prescribed to C=12 bits and a maximum value of X is X=81 bits. In this case, a difference of 1.86 dB occurs between the encoding gain in the voiced state ($K_{81}$=3.26) and the encoding gain in the silent state ($K_0$=5.00). The encoding gain in the silent state is larger, because the proportion of the tail bits within the total number of bits input to the encoder increases. Since the encoding gain differs between the voiced state and the silent state, the error correction capability during the decoding process after the signal of the up-link is received by the base station apparatus Node-B becomes different between the two states, to thereby affect the result of the quality measurements.

In the base station apparatus Node-B, a data sequence a(i) {i=1, 2, 3, . . . , Y} is input to a Viterbi decoder as shown in FIG. 5B, and converted into a data sequence b(j) {j=1, 2, 3, . . ., Y/3} that has been subjected to the error correction.

If the quality monitoring is made by the radio network control apparatus RNC using the QE value as the reception quality when carrying out the outer loop control, the obtained data sequence b(j) is again input to the convolution encoder so as to obtain a data sequence of an output a'(i) {i=1, 2, 3, . . . , Y}. From the data a(i) and a'(i), a Bit Error Rate (BER) of the transport channels can be calculated from the following formula, and the calculated BER value is used as the quality information for the outer loop control.

$$BER = \frac{1}{Y}\sum_{i=1}^{Y}[a(i) \oplus a'(i)]$$

On the other hand, if the quality monitoring is made by the radio network control apparatus RNC using the CRCI judgement result as the reception quality when carrying out the outer loop control, the CRCI judgement result may be affected depending on the magnitude of the encoding gain. When the outer loop control is carried out with respect to the audio transmission, the error correction capability during the decoding process is improved in the silent state because the encoding gain in the silent state is large compared to that in the voiced state, and the CRCI judgement result becomes "normal reception (OK)" for most transport blocks (TBs). For this reason, in the radio network control apparatus RNC, the quality in the silent state is estimated as being high compared to that in the voiced state. Consequently, in order to obtain a transmission quality such that the transmission block error rate (BLER) is approximately the same for the silent and voiced states, the reference SIR that is demanded has a smaller value for the silent state.

Accordingly, when the outer loop transmission power control for monitoring the transmission quality is carried out for the audio transmission radio access bearer RAB#1, with respect to the physical channel in which a plurality of radio access bearers (RABs) are mapped, which transmit packets of Internet-adapted contents service data, mail and the like, in addition to making audio transmission, a large difference may be introduced between the qualities of the audio transmission radio access bearer RAB#1 and another data transmission radio access bearer (RAB) when the audio switches from the voiced state to the silent state.

Normally, the quality difference between the radio access bearers (RABs) is adjusted by bit repetition or puncture during a rate matching process. However, if the quality difference is considerably large, such an adjustment is insufficient. When the outer loop control is carried out with respect to the quality of the audio transmission radio access bearer RAB#1 in such a situation, the transmission quality of the radio access bearer (RAB) other than the audio may deteriorate in some cases.

An example of this will now be described. When the audio transmission access bearers (RABs) (up-line, 12.2 kbps) are mapped in the physical channel, it is assumed that the reference SIR value satisfying a target value of the audio transmission quality decreases by a in the silent state (TFI=0 for the radio access bearer RAB#1) compared to that in the voiced state (TFI=2 for the radio access bearer RAB#1).

For the case where the audio transmission radio access bearer (up-line, 12.2 kbps) and the packet transmission radio access bearer (up-line, 32 kbps) are mapped in the same physical channel, FIG. 6A shows a transition of the reference SIR value with time when the outer loop transmission power control is not carried out, and FIG. 6B shows a transition of the reference SIR value with time when the outer loop transmission power control is carried out based on the quality monitoring of the audio transmission radio access bearer RAB#1.

When setting the physical channel in the base station apparatus Node-B, suppose that the reference SIR value is set to sir_12 by notification of the Node B Application Protocol (NBAP), the transport format indicator (TFI)=2 (voiced state) for the audio transmission radio access bearer RAB#1 and the transport format indicator (TFI)=2 for the packet transmission radio access bearer (RAB). In this state, a case will be considered where the audio is switched from the voiced state to the silent state (TFI=0).

In the case where the outer loop transmission power control is not carried out, the reference SIR value is fixed to sir_12 as shown in FIG. 6A, regardless of the value of the transport format indicator (TFI) of the audio transmission radio access bearer (RAB). However, in the case where a difference is introduced in the qualities of the audio transmission and the packet transmission due to the switching to the silent state, and the outer loop control by the quality monitoring of the audio transmission radio access bearer RAB#1 is continued before and after the switching, the reference SIR value decreases by α as shown in FIG. 6B. As a result, the audio quality is maintained constant, but the transmission quality of the packet deteriorates when the switching to the silent state is occurs due to the decrease of the reference SIR value.

Next, a description will be given of the problems to be solved when carrying out an adding process to add a radio access bearer (RAB). When carrying out the outer loop control with respect to a specific physical channel, it is necessary to make the transmission according to the target quality even after the adding process is carried out to add the radio access bearer (RAB).

When setting the physical channel, suppose that the reference SIR value is set to sir?1 in the base station apparatus Node-B by the NBAP notification. In the case where no outer loop control is carried out, the reference SIR value is constant (sir_1). On the other hand, when carrying out the outer loop control based on the quality monitoring of with respect to the radio access bearer RAB(1), a process is carried out to increase or decrease the reference SIR value based on the Iub notification using sir_1 as a starting point. A change in the reference SIR value with time will be considered, for the case where the radio access bearer RAB(2) is added to the physical channel to which the radio access bearer RAB(1) is mapped.

As shown in FIG. 7A, the radio network control apparatus RNC notifies the reference SIR value to the base station apparatus Node-B by the NBAP when adding the radio access bearer RAB(2), and updates the reference SIR value by carrying out the outer loop transmission power control via the interface Iub.

If the reference SIR value notified by the NBAP is sir_12 when adding the radio access bearer RAB(2) and the outer loop transmission power control is not carried out, the reference SIR value in the base station apparatus Node-B becomes sir_12 and constant when adding the radio access bearer RAB(2), as shown in FIG. 7B.

When the radio access bearer RAB(2) is added when carrying out the outer loop transmission power control, the reference SIR value is once set to sir_12 in the base station apparatus Node-B by the NBAP notification, as shown in FIG. 7C. However, the process of increasing or decreasing the reference SIR value by the Iub notification from the radio network control apparatus RNC is carried out regardless of the setting by the NBAP notification, and the set value of the reference SIR value by the outer loop transmission power control is updated by inheriting the value before the radio access bearer RAB(2) was added.

For this reason, as shown in FIG. 7C, the reference SIR value increases to sir_12 immediately after the radio access bearer RAB(2) is added, but thereafter decreases to the original value due to the Iub notification. In order to satisfy the target quality of both the radio access bearers RAB(1) and RAB(2), it is necessary to increase the reference SIR value to follow sir_12, but if the reference SIR value, sir_12, after adding the radio access bearer RAB(2) is sufficiently large with respect to the reference SIR value, sir_1, before the radio access bearer RAB(2) was added, it requires a long time to increase the SIR value to a value that satisfies the target quality, and until this value that satisfies the target quality is reached, the transmission quality continues be deteriorated.

Next, a description will be given of the problems to be solved when carrying out a delete process to delete a radio access bearer (RAB). If the outer loop control is carried out with respect to the physical channel to which a plurality of radio access bearers (RABs) are mapped and the delete process is carried out to delete a single radio access bearer (RAB), it is necessary to carry out the transmission according to the target quality even after the delete process is carried out. For example, when the radio access bearer RAB(2) is deleted in the physical channel to which the radio access bearer RAB(1) and the radio access bearer RAB(2) are mapped, the reference SIR value changes with time as shown in FIG. 8B when the outer loop control is not carried out and as shown in FIG. 8C when the outer loop control is carried out.

When the physical channel to which the radio access bearer RAB(1) and the radio access bearer RAB(2) are mapped is set, suppose that the reference SIR value is set to sir_12' in the base station apparatus Node-B by the NBAP notification. The reference SIR value is sir_12' when the outer loop transmission power control is not carried out. On the other hand, when the outer loop transmission power control is carried out based on the quality monitoring with respect to the radio access bearer RAB(1), the process of increasing or decreasing the reference SIR value is carried out based on the Iub notification using sir_12' as a starting point.

The change in the reference SIR value with time will be considered for a case where the radio access bearer BAR(2) is deleted. As shown in FIG. 13A, the radio network control apparatus RNC notifies the reference SIR value to the base station apparatus Node-B by the NBAP when deleting the radio access bearer RAB(2), and carries out the outer loop transmission power control via the interface Iub, to update the reference SIR value.

If it is assumed that the reference SIR value notified by the NBAP is sir_1" when deleting the radio access bearer RAB (2), the reference SIR value in the base station apparatus Node-B becomes sir_1' and constant as shown in FIG. 8B when deleting the radio access bearer RAB(2).

If the radio access bearer RAB(2) is deleted when carrying out the outer loop control, the reference SIR value in the base station apparatus (Node-B) is once set to sir_1' by the NBAP notification, as shown in FIG. 8C. However, the process of increasing or decreasing the reference SIR value by the Iub notification is carried out regardless of the setting by the NBAP notification. Consequently, the set value of the reference SIR value by the outer loop transmission power control is updated by inheriting the value before the radio access bearer RAB(2) was deleted.

Therefore, as shown in FIG. 8C, the reference SIR value decreases to sir_1' in the base station apparatus Node-B immediately after the deletion of the radio access bearer RAB(2), but thereafter increases to the original value by the Iub notification. As a result, the quality of the radio access bearer RAB(1) becomes excessively high with respect to the target value.

It is thus necessary to decrease the reference SIR value to follow sir_1' in order to decrease the quality of the radio access bearer RAB(1) to the target value. However, if the reference SIR value, sir_1', is sufficiently small with respect to the reference SIR value, sir_12', before the radio access bearer RAB(2) was deleted, it requires a long time to decrease the reference SIR value, and while the SIR value is being decreased, the quality becomes excessively high.

SUMMARY OF THE INVENTION

Accordingly, it is a general object of the present invention to provide a novel and useful transmission power control method and apparatus for mobile communication system, in which the problems described above are suppressed.

Another and more specific object of the present invention is to provide a transmission power control method and apparatus for mobile communication system, which can carry out a transmission that always enables a reception quality immediately conforming to a target quality for a set radio access bearer (RAB) to be obtained, even if a change is made in the radio access bearers (RABs) or a considerable change is made in a number of data bits, such as a case where an audio switching is made from a voiced state to a silent state and a case where a radio access bearer (RAB) is added or deleted, to thereby improve the performance of an outer loop control of a multi-call setting, when carrying out a transmission power control in a mobile communication system.

Still another object of the present invention is to provide a transmission power control apparatus adapted to control a reference value for controlling a transmission power of a mobile terminal equipment based on a reception quality of a plurality of radio access bearers at a base station apparatus, with respect to a physical channel to which the plurality of radio access bearers are mapped, when making a radio connection between the mobile terminal equipment and the base station apparatus in a mobile communication system, the transmission power control apparatus comprising a judging part configured to judge whether or not a radio access bearer that is a monitoring target of the reception quality is an audio transmission radio access bearer in a silent state, based on multiplexed information; and a switching part configured to switch the radio access bearer that is the monitoring target of the reception quality to a radio access bearer other than the audio transmission radio access bearer in the silent state, if the judging part judges that the radio access bearer than is the monitoring target of the reception quality is the audio transmission radio access bearer in the silent state, wherein the reference value for controlling the transmission power of the mobile terminal equipment is controlled based on a reception quality of the radio access bearer other than the audio transmission radio access bearer in the silent state. According to the transmission power control apparatus of the present invention, it is possible to prevent a sharp drop in the reference value when the switching is made to the silent state, and to maintain the quality of the other radio access bearers. In addition, it is possible to carry out a transmission that always enables a reception quality immediately conforming to a target quality for a set radio access bearer (RAB) to be obtained, even if a change is made in the radio access bearers (RABs) or a considerable change is made in a number of data bits, such as a case where an audio switching is made from a voiced state to a silent state and a case where a radio access bearer (RAB) is added or deleted, to thereby improve the performance of an outer loop control of a multi-call setting, when carrying out a transmission power control in a mobile communication system.

A further object of the present invention is to provide a transmission power control apparatus adapted to control a reference Signal-power-to-Interference-power Ratio (SIR) value for controlling a transmission power of a mobile terminal equipment based on a reception quality of a plurality of radio access bearers at a base station apparatus, with respect to a physical channel to which the plurality of radio access bearers are mapped, when making a radio connection between the mobile terminal equipment and the base station apparatus in a mobile communication system, the transmission power control apparatus comprising a calculating part configured to calculate an increase or decrease value of the reference SIR value for an inner loop transmission power control based on reception quality information; an updating part configured to update a reference value of the reference SIR value when adding or deleting a radio access bearer; an adding part configured to add the increase or decrease value to the reference value of the reference SIR value; and a notifying part configured to notify an added value of the reference value and the increase or decrease value to the base station apparatus as a set value of the reference SIR value, wherein a transmission power control is carried out by setting the reference SIR value based on an updated reference value when adding or deleting the radio access bearer.

According to the transmission power control apparatus of the present invention, it is possible to prevent the quality from becoming deteriorated or to prevent an excessively high quality from being maintained, when the radio access bearer is added or deleted. In addition, it is possible to carry out a transmission that always enables a reception quality immediately conforming to a target quality for a set radio access bearer (RAB) to be obtained, even if a change is made in the radio access bearers (RABs) or a considerable change is made in a number of data bits, such as a case where an audio switching is made from a voiced state to a silent state and a case where a radio access bearer (RAB) is added or deleted, to thereby improve the performance of an outer loop control of a multi-call setting, when carrying out a transmission power control in a mobile communication system.

Another object of the present invention is to provide a transmission power control apparatus adapted to control a reference Signal-power-to-Interference-power Ratio (SIR) value for controlling a transmission power of a mobile terminal equipment based on a reception quality of a plurality of radio access bearers at a base station apparatus, with respect to a physical channel to which the plurality of radio access bearers are mapped, when making a radio connection between the mobile terminal equipment and the base station apparatus in a mobile communication system, the transmission power control apparatus comprising a calculating part configured to calculate an increase or decrease value of the reference SIR value for an inner loop transmission power control based on reception quality information; an updating part configured to update a reference value of the reference SIR value when adding or deleting a radio access bearer; and a notifying part configured to notify an updated reference value to the base station apparatus, wherein the base station apparatus sets an added value of the increase or decrease value and the reference value notified from a radio network control apparatus which controls the base station apparatus, as the reference SIR value, and caries out a transmission power control by setting the reference SIR value based on the updated reference value when adding or deleting the radio access bearer. According to the transmission power control apparatus of the present invention, it is possible to prevent the quality from becoming deteriorated or to prevent an excessively high quality from being maintained, when the radio access bearer is added or deleted. In addition, it is possible to carry out a transmission that always enables a reception quality immediately conforming to a target quality for a set radio access bearer (RAB) to be obtained, even if a change is made in the radio access bearers (RABs) or a considerable change is made in a number of data bits, such as a case where an audio switching is made from a voiced state to a silent state and a case where a radio access bearer (RAB) is added or deleted, to thereby improve the performance of an outer loop control of a multi-call setting, when carrying out a transmission power control in a mobile communication system.

Still another object of the present invention is to provide a transmission power control method for controlling a reference value for controlling a transmission power of a mobile terminal equipment based on a reception quality of a plurality of radio access bearers at a base station apparatus, with respect to a physical channel to which the plurality of radio access bearers are mapped, when making a radio connection between the mobile terminal equipment and the base station apparatus in a mobile communication system, the transmission power control method comprising the steps of (a) judging whether or not a radio access bearer that is a monitoring target of the reception quality is an audio transmission radio access bearer in a silent state, based on multiplexed information; and (b) switching the radio access bearer that is the monitoring target of the reception quality to a radio access bearer other than the audio transmission radio access bearer in the silent state, if the step (a) judges that the radio access bearer than is the monitoring target of the reception quality is the audio transmission radio access bearer in the silent state, wherein the reference value for controlling the transmission power of the mobile terminal equipment is controlled based on a reception quality of the radio access bearer other than the audio transmission radio access bearer in the silent state. According to the transmission power control method of the present invention, it is possible to prevent a sharp drop in the reference value when the switching is made to the silent state, and to maintain the quality of the other radio access bearers. In addition, it is possible to carry out a transmission that always enables a reception quality immediately conforming to a target quality for a set radio access bearer (RAB) to be obtained, even if a change is made in the radio access bearers (RABs) or a considerable change is made in a number of data bits, such as a case where an audio switching is made from a voiced state to a silent state and a case where a radio access bearer (RAB) is added or deleted, to thereby improve the performance of an outer loop control of a multi-call setting, when carrying out a transmission power control in a mobile communication system.

A further object of the present invention is to provide a transmission power control method for controlling a reference Signal-power-to-Interference-power Ratio (SIR) value for controlling a transmission power of a mobile terminal equipment based on a reception quality of a plurality of radio access bearers at a base station apparatus, with respect to a physical channel to which the plurality of radio access bearers are mapped, when making a radio connection between the mobile terminal equipment and the base station apparatus in a mobile communication system, the transmission power control method comprising the steps of (a) calculating an increase or decrease value of the reference SIR value for an inner loop transmission power control based on reception quality information; (b) updating a reference value of the reference SIR value when adding or deleting a radio access bearer; (c) adding the increase or decrease value to the reference value of the reference SIR value; and (d) notifying an added value of the reference value and the increase or decrease value to the base station apparatus as a set value of the reference SIR value, wherein the steps (a) through (d) are carried out by a radio network control apparatus which controls the base station apparatus, and a transmission power control is carried out by setting the reference SIR value based on an updated reference value when adding or deleting the radio access bearer. According to the transmission power control method of the present invention, it is possible to prevent the quality from becoming deteriorated or to prevent an excessively high quality from being maintained, when the radio access bearer is added or deleted. In addition, it is possible to carry out a transmission that always enables a reception quality immediately conforming to a target quality for a set radio access bearer (RAB) to be obtained, even if a change is made in the radio access bearers (RABs) or a considerable change is made in a number of data bits, such as a case where an audio switching is made from a voiced state to a silent state and a case where a radio access bearer (RAB) is added or deleted, to thereby improve the performance of an outer loop control of a multi-call setting, when carrying out a transmission power control in a mobile communication system.

Another object of the present invention is to provide a transmission power control method for controlling a reference Signal-power-to-Interference-power Ratio (SIR) value for controlling a transmission power of a mobile terminal equipment based on a reception quality of a plurality of radio access bearers at a base station apparatus, with respect to a physical channel to which the plurality of radio access bearers are mapped, when making a radio connection between the mobile terminal equipment and the base station apparatus in a mobile communication system, the transmission power control method comprising the steps of (a) calculating an increase or decrease value of the reference SIR value for an inner loop transmission power control based on reception quality information; (b) updating a reference value of the reference SIR value when adding or deleting a radio access bearer; and (c) notifying an updated reference value to the base station apparatus, wherein the steps (a) through (c) are carried out by a radio network control apparatus which controls the base station apparatus, and the base station apparatus sets an added value of the increase or decrease value and the reference value notified from a radio network apparatus as the reference SIR value, and caries out a transmission power control by setting the reference SIR value based on the updated reference value when adding or deleting the radio access bearer. According to the transmission power control method of the present invention, it is possible to prevent the quality from becoming deteriorated or to prevent an excessively high quality from being maintained, when the radio access bearer is added or deleted. In addition, it is possible to carry out a transmission that always enables a reception quality immediately conforming to a target quality for a set radio access bearer (RAB) to be obtained, even if a change is made in the radio access bearers (RABs) or a considerable change is made in a number of data bits, such as a case where an audio switching is made from a voiced state to a silent state and a case where a radio access bearer (RAB) is added or deleted, to thereby improve the performance of an outer loop control of a multi-call setting, when carrying out a transmission power control in a mobile communication system.

Other objects and further features of the present invention will be apparent from the following detailed description when read in conjunction with the accompanying drawings.

BRIEF DESCRIPTION OF THE DRAWINGS

FIG. 3 is a diagram showing coding and multiplexing schemes for an up-link when carrying out a multi-call transmission of packet channels and audio channels by AMR coding;

FIGS. 4A and 4B respectively are diagrams for explaining allocation of Transport Format Indicator (TFI) and Transport Format Combination Indicator (TFCI) when carrying out the multi-call transmission of packet channels and audio channels;

FIGS. 10A and 10B respectively are diagrams for explaining an operation and a change in SIR value with time when adding a radio access bearer (RAB) in a second embodiment of the transmission power control apparatus according to the present invention;

DESCRIPTION OF THE PREFERRED EMBODIMENTS

Figure 1:
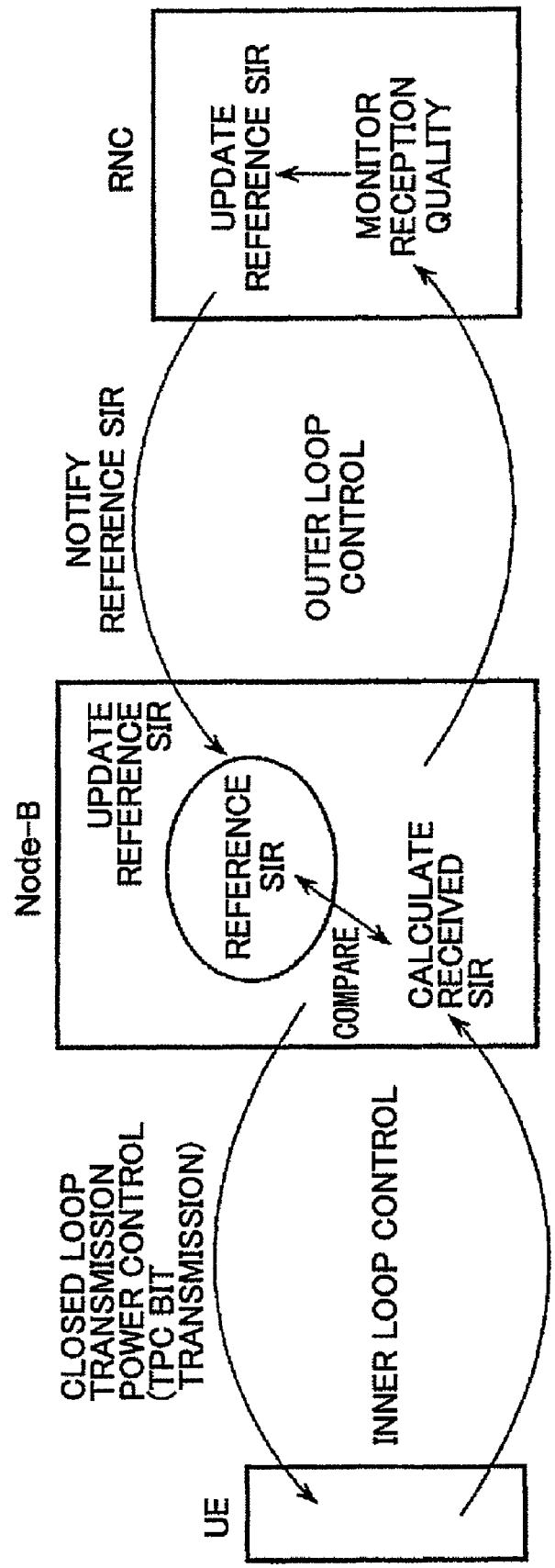
FIG. 1 is a diagram for explaining an up-link transmission power control.
Figure 2A:
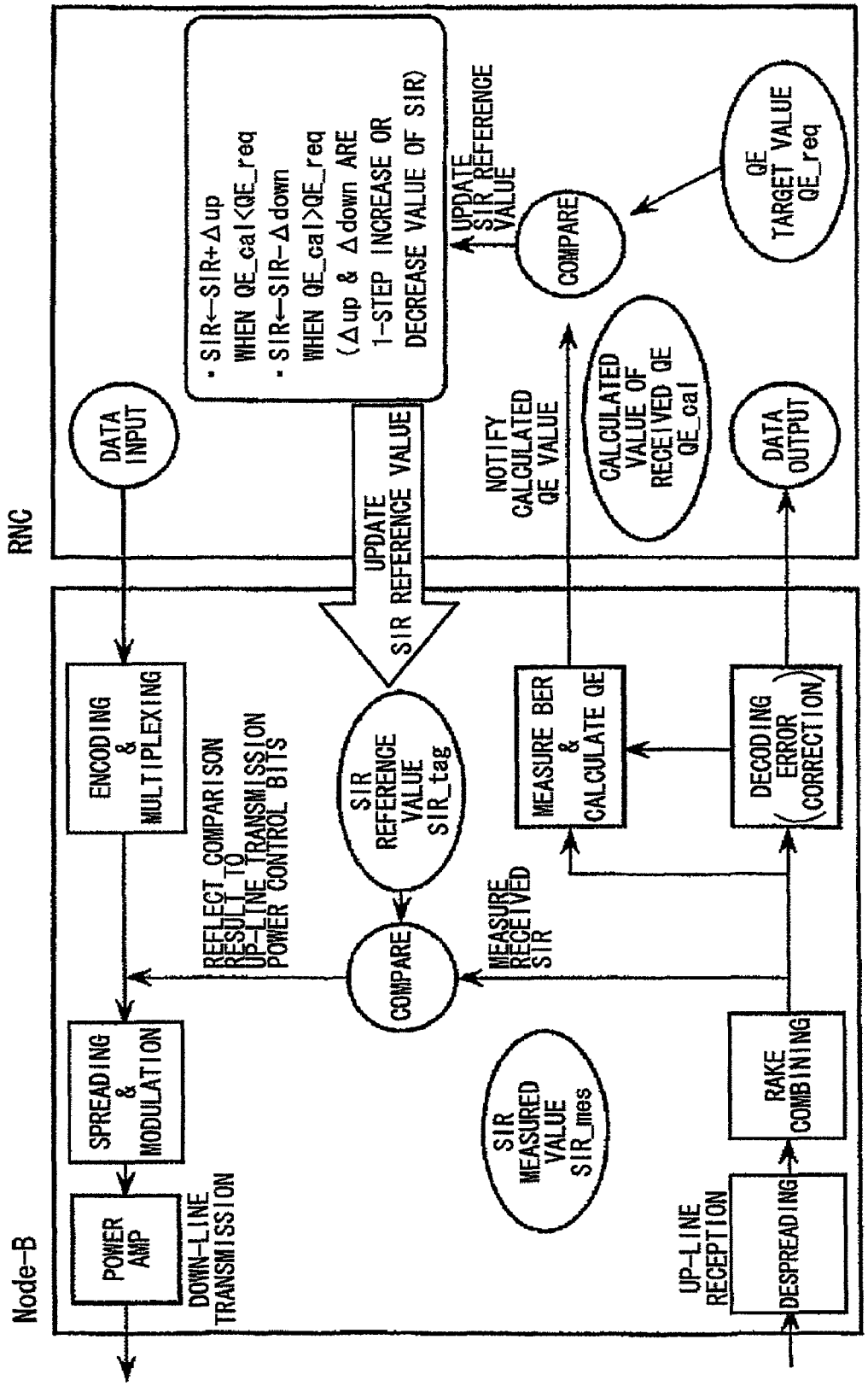
FIGS. 2A and 2B respectively are diagrams for explaining an outer loop transmission power control using QE and RCI reception quality parameters.
Figure 2B:
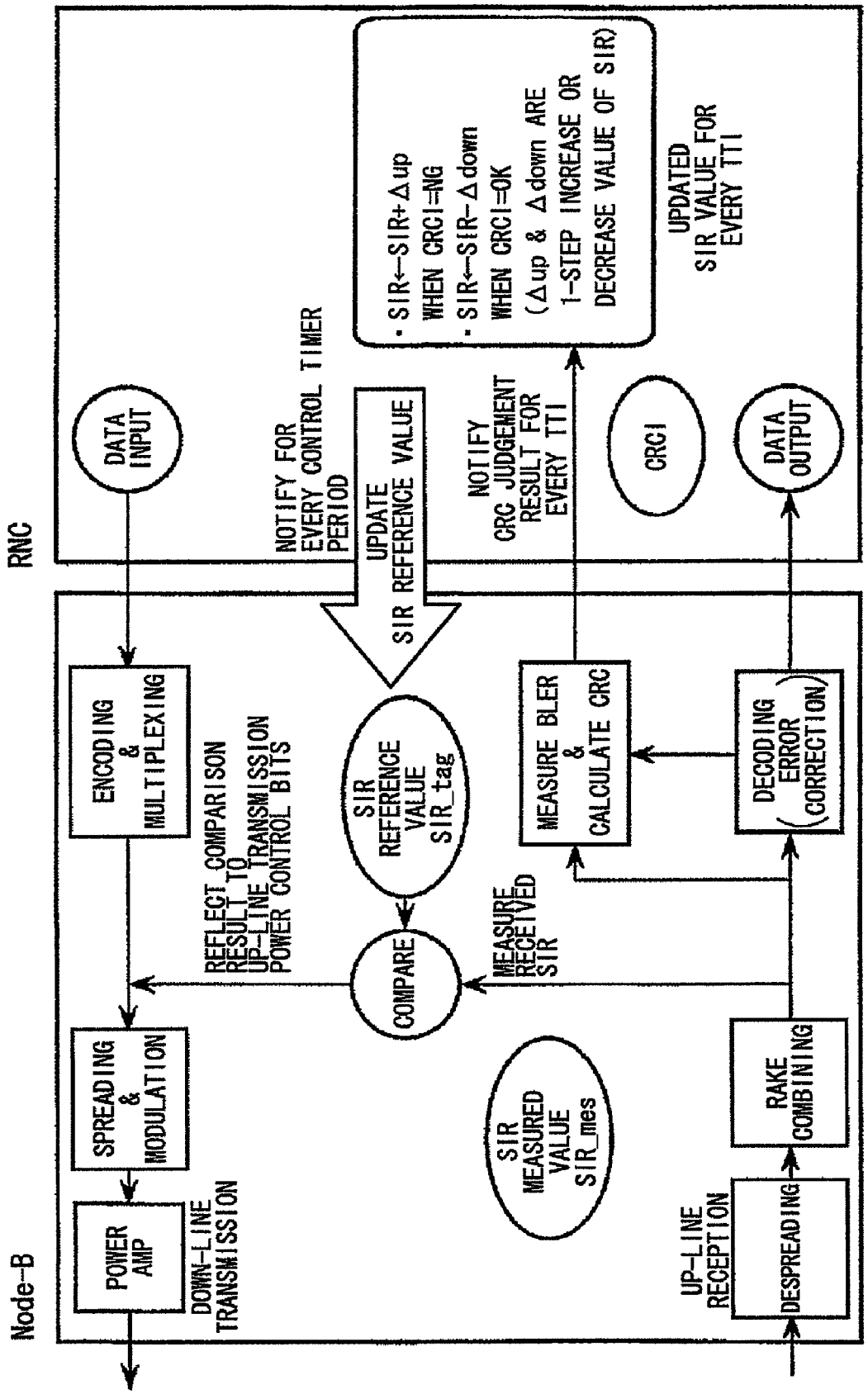
Figure 5A:
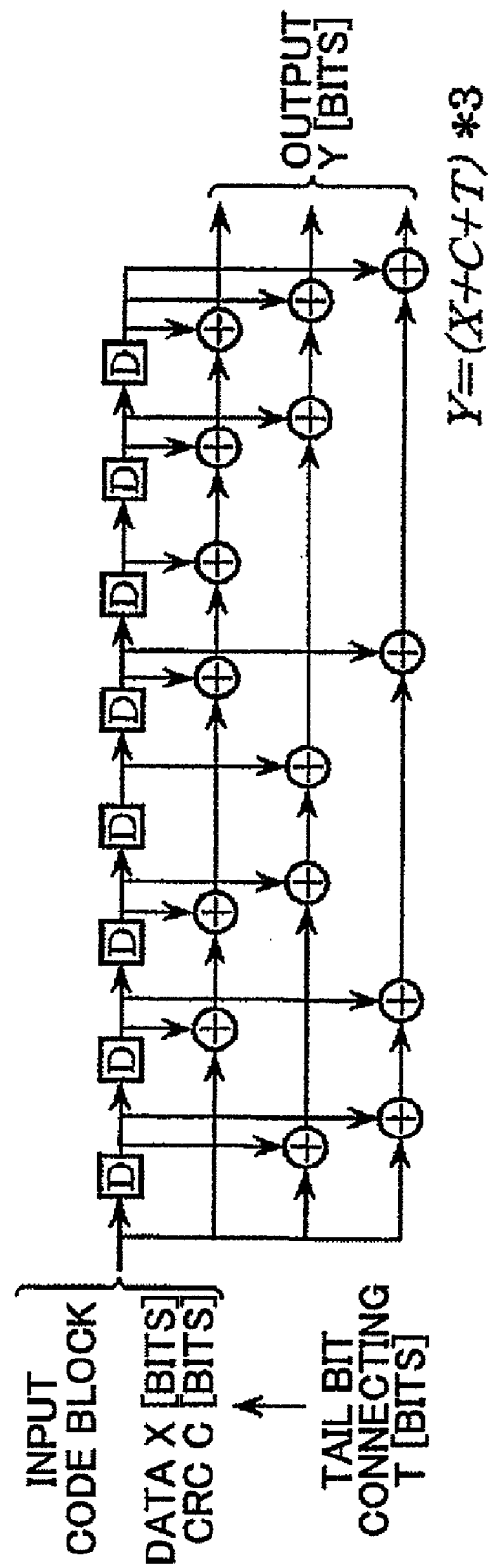
FIGS. 5A and 5B respectively are diagrams for explaining a convolution encoding in an up-link and calculation of a transport channel bit error rate.
Figure 5B:
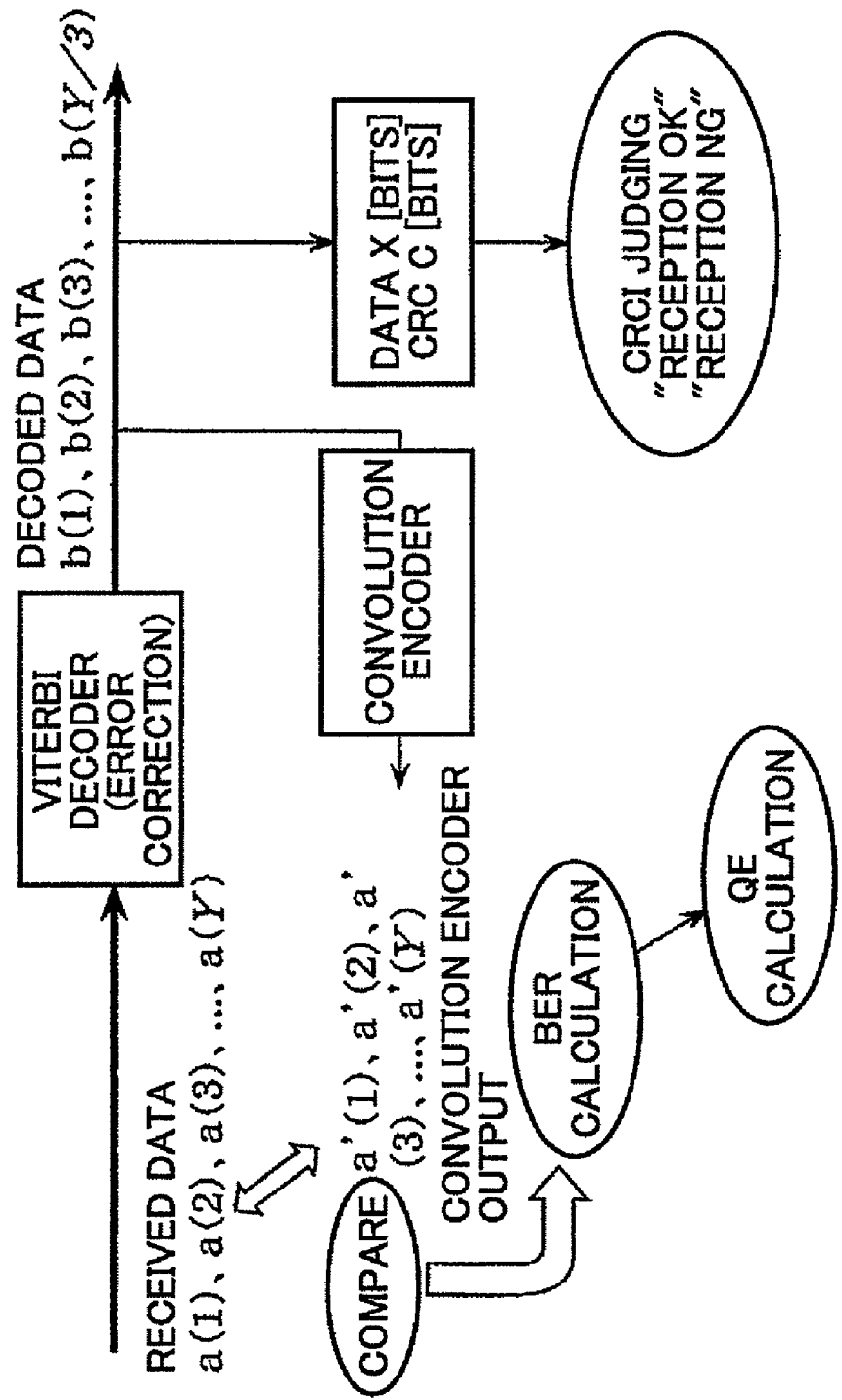
Figure 6A:
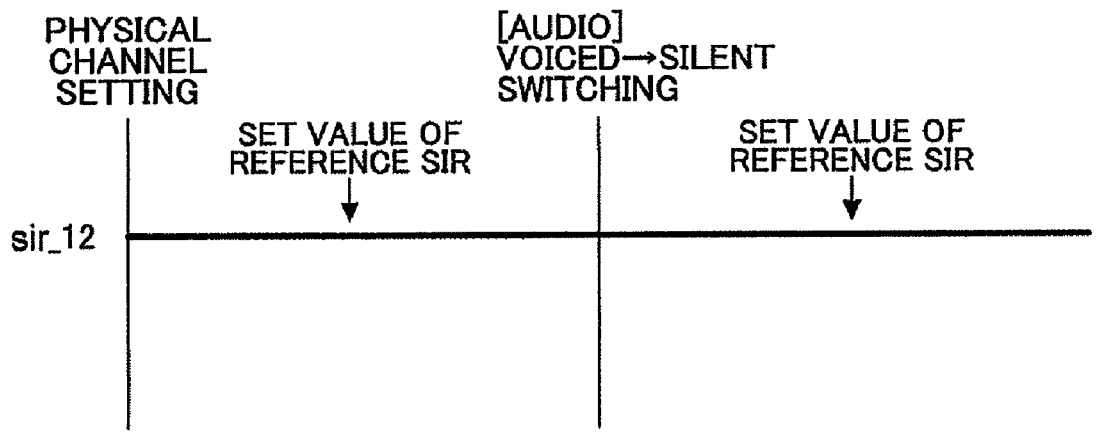
FIGS. 6A and 6B respectively are diagrams for explaining a change in reference SIR value with time when switching to a silent state.
Figure 6B:
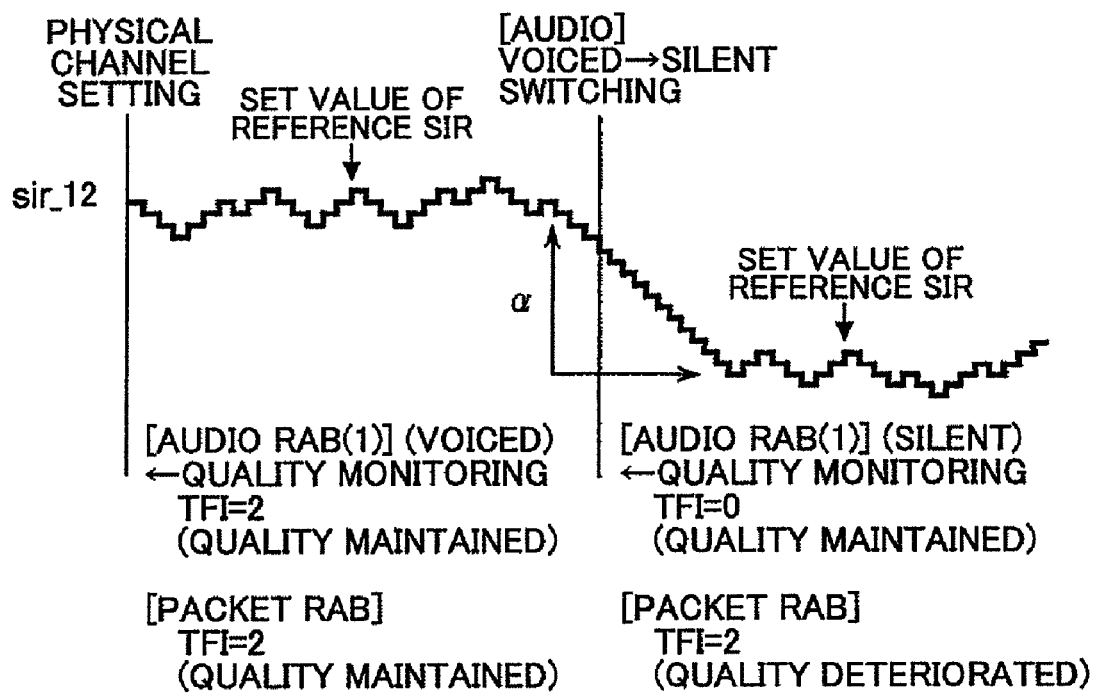
Figure 7A:
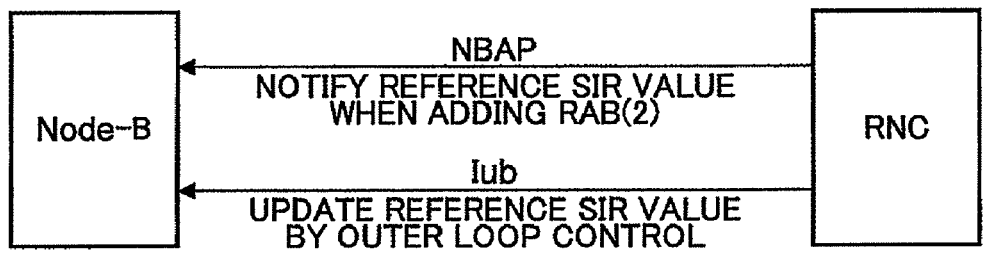
FIGS. 7A through 7C respectively are diagrams for explaining a change in reference SIR value when adding a radio access bearer (RAB)
Figure 7B:
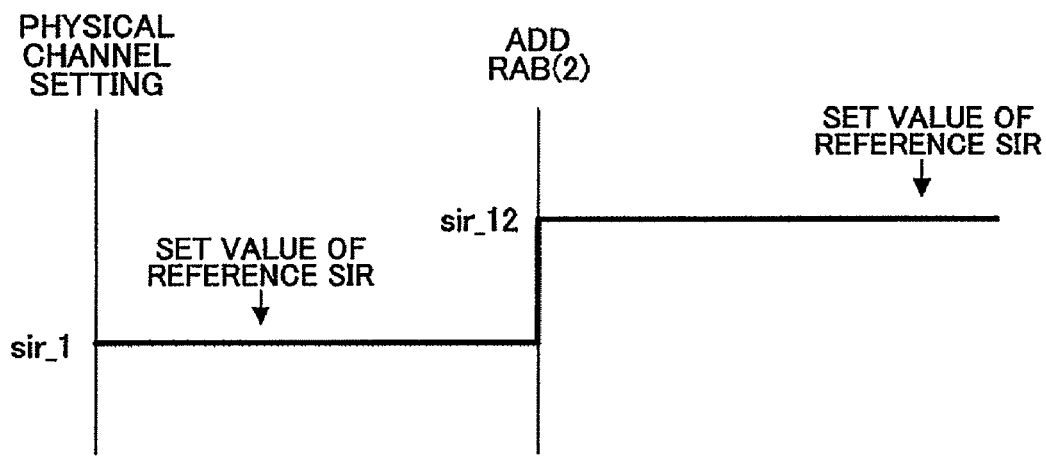
Figure 7C:
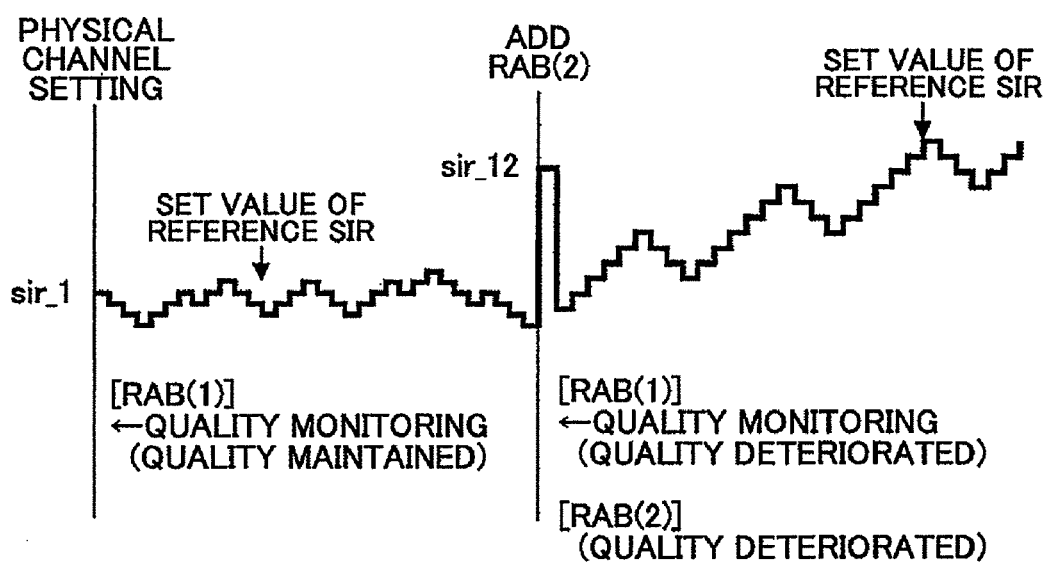
Figure 8A:
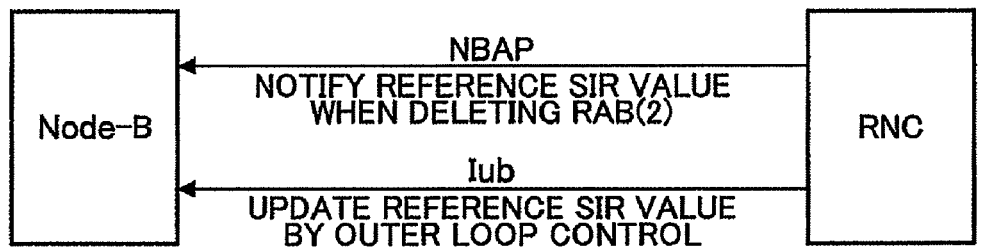
FIGS. 8A through 8C respectively are diagrams for explaining a change in reference SIR value when deleting a radio access bearer (RAB)
Figure 8B:
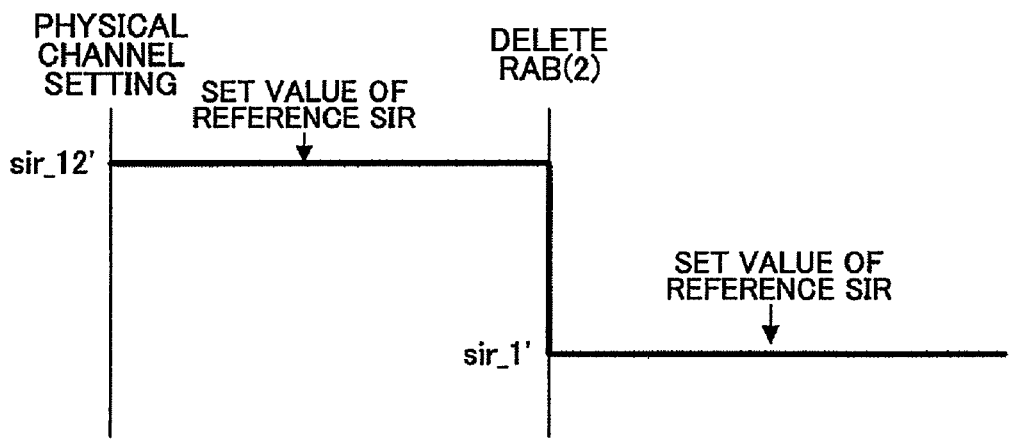
Figure 8C:
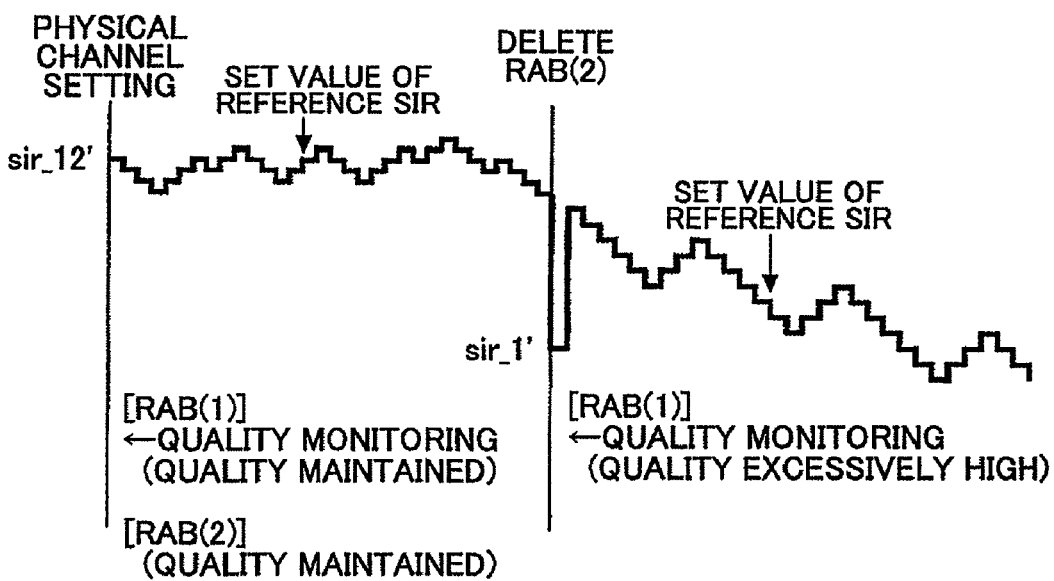
Figure 9A:
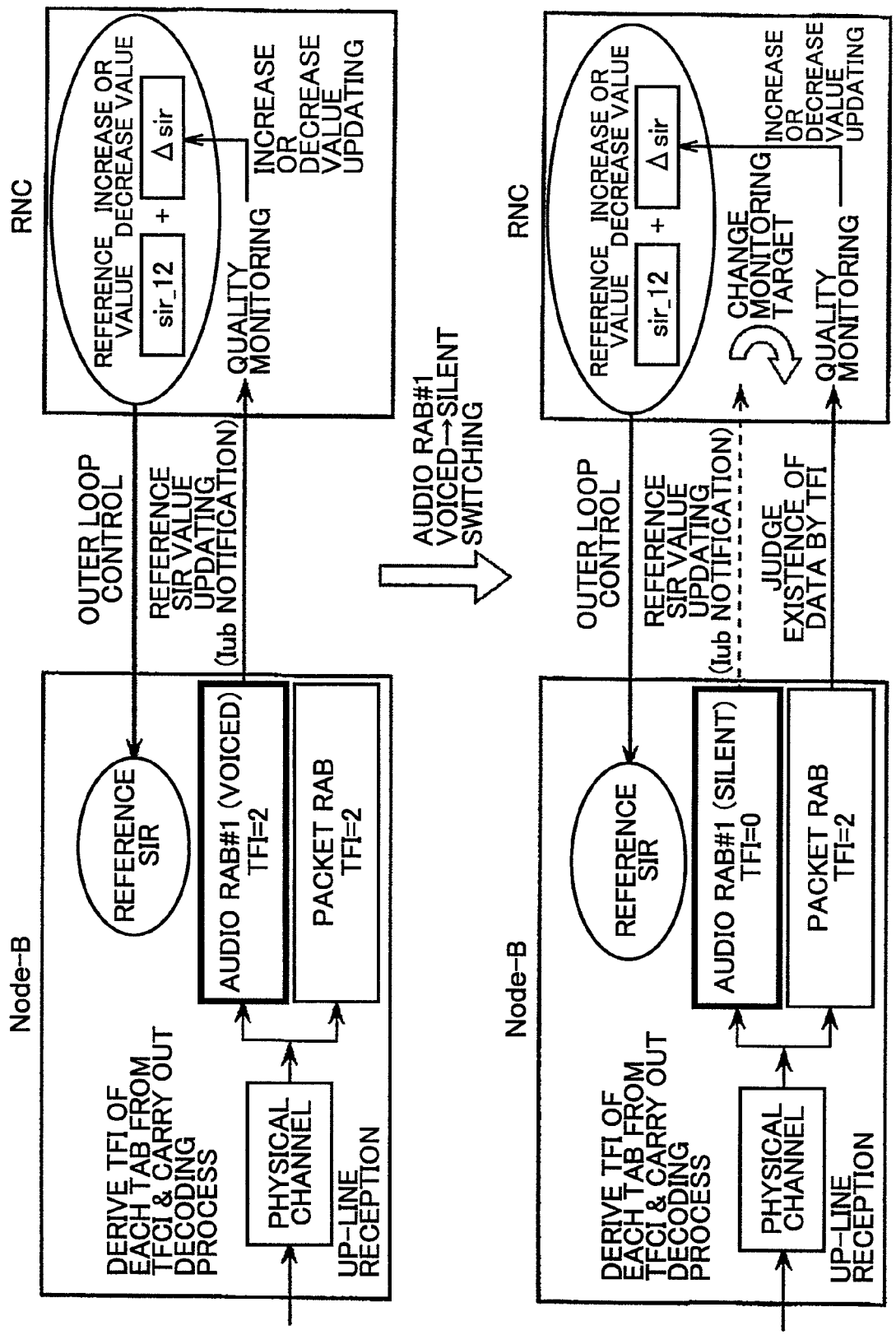
FIGS. 9A and 9B respectively are diagrams for explaining an operation and a change in SIR value with time when switching to a silent state in a first embodiment of a transmission power control apparatus according to the present invention.
Figure 9B:
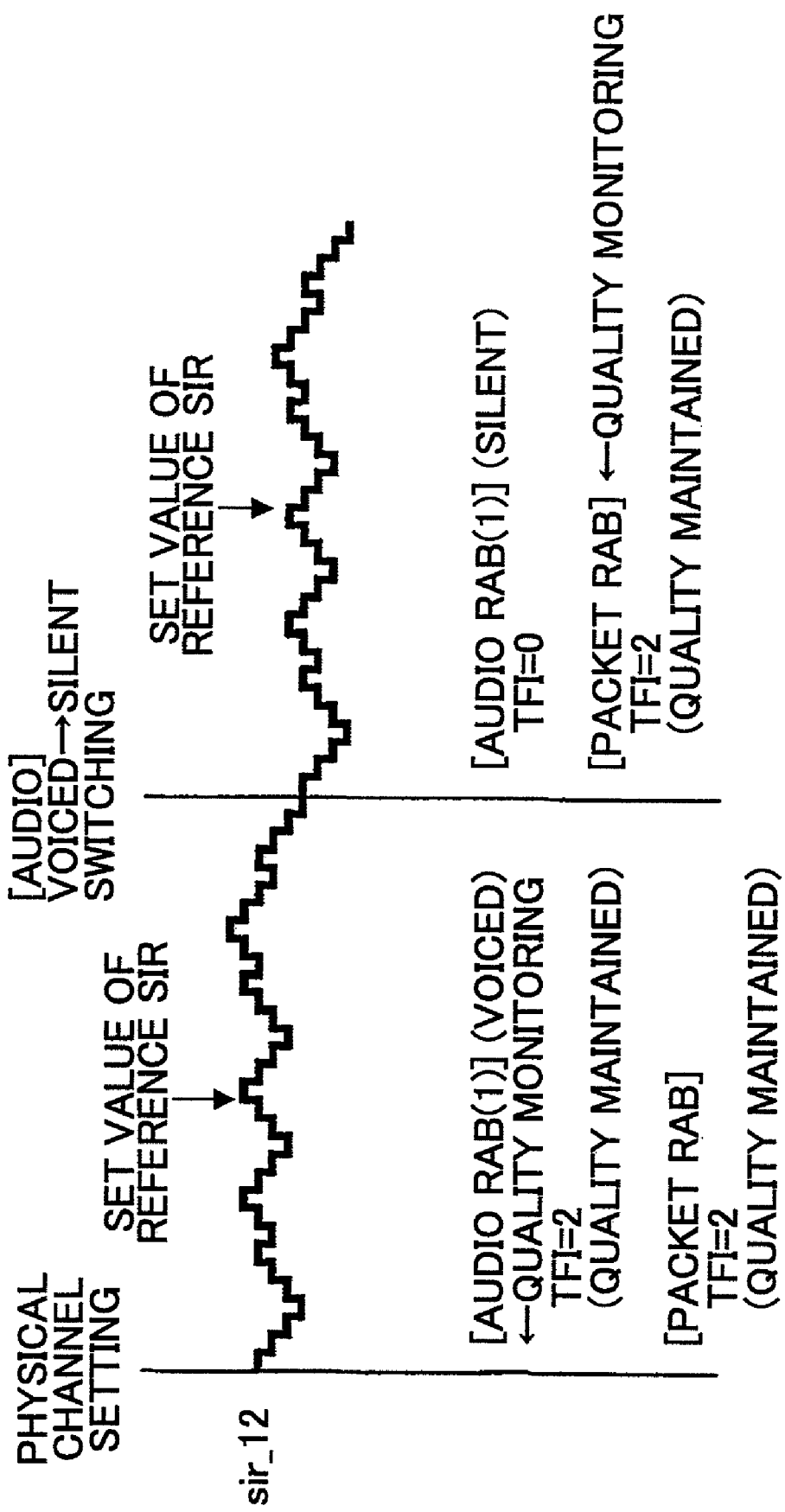

FIGS. 9A and 9B respectively are diagrams for explaining an operation and a change in SIR value with time when switching to a silent state in a first embodiment of a transmission power control apparatus according to the present invention. This first embodiment of the transmission power control apparatus employs a first embodiment of a transmission power control method according to the present invention.

In this first embodiment, a quality monitoring of a radio access bearer (RAB) in a radio network control apparatus RNC is carried out as follows when carrying out an outer loop transmission power control, if an audio transmission radio access bearer RAB#1 that employs an Adaptive Multi-Rate (AMR) coding including no data bits is mapped in a physical channel.

When carrying out an outer loop transmission power control in the physical channel to which a plurality of radio access bearers (RABs) are mapped in addition to the audio transmission radio access bearer RAB#1, the existence or non-existence of data is judged from a transport format indicator (TFI) of the audio transmission radio access bearer RAB#1. The value of the transport format indicator (TFI) of each radio access bearer (RAB) is derived by a transport format combination indicator (TFCI) that is received by a base station apparatus Node-B and is notified to the radio network control apparatus RNC.

In a case where the transport format indicator (TFI)=0 for the audio transmission radio access bearer RAB#1, the audio transmission radio access bearer RAB#1 is excluded from a target of a quality monitoring of the outer loop transmission power control. If the value of the transport format indicator (TFI) switches to 0 in a state where the quality monitoring is carried out with respect to the audio transmission radio access bearer RAB#1, the radio network control apparatus RNC continues the outer loop transmission power control by switching the target of the quality monitoring of the outer loop transmission power control to another radio access bearer (RAB) having a transport format indicator (TFI) that is not 0.

In FIG. 9A, it is assumed for the sake of convenience that the outer loop transmission power control is carried out in the physical channel to which the audio transmission radio access bearer RAB#1 (up-line, 12.2 kbps) and the packet transmission radio access bearer (RAB) (up-line, 32 kbps) are mapped. Further, it is assumed that the set value of the reference SIR value by the NBAP notification when setting the physical channel is sir_12, the audio transmission radio access bearer RAB#1 has a transport format indicator (TFI)=2 (voiced state), and the packet transmission radio access bearer (RAB) has a transport format indicator (TFI)=2.

The base station apparatus (Node-B) derives the transport format indicator (TFI) of each radio access bearer (RAB) from the received transport format combination indicator (TFCI) and notifies the transport format indicator (TFI) to the radio network control apparatus RNC. The radio network control apparatus RNC carries out the outer loop transmission power control with the target of the quality monitoring being the voiced audio transmission radio access bearer RAB#1, as indicated in the top portion of FIG. 9A. The lower portion of FIG. 9A shows the operation when the audio switches from the voiced state to the silent state where the transport format indicator (TFI)=0, and FIG. 9B shows a change in the reference SIR value with time.

When the switching to the silent state is made, the radio network control apparatus RNC recognizes that the transport format indicator (TFI) of the audio transmission radio access bearer RAB#1 has become 0 and excludes the audio transmission radio access bearer RAB#1 from the target of the quality monitoring. In addition, the radio network control apparatus RNC continues the outer loop transmission power control by switching the target of the quality monitoring to the packet transmission radio access bearer (RAB) having the transport format index (TFI) that is 2, and notifies the reference SIR value to the base station apparatus Node-B. Hence, it is possible to prevent a sharp drop in the reference SIR value when the audio is switched to the silent state, to thereby maintain the quality of the packet transmission.

Figure 10A:
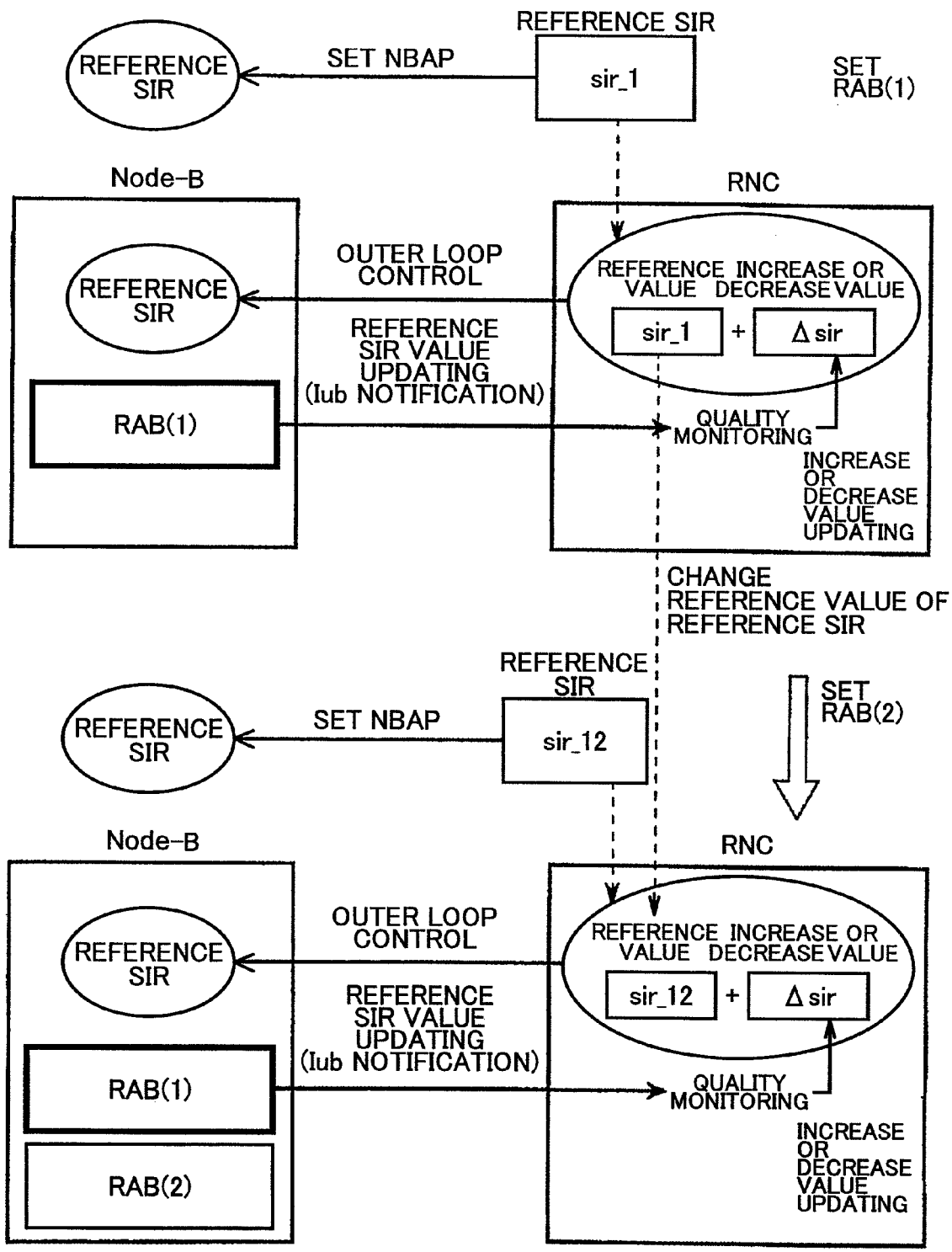
Figure 11A:
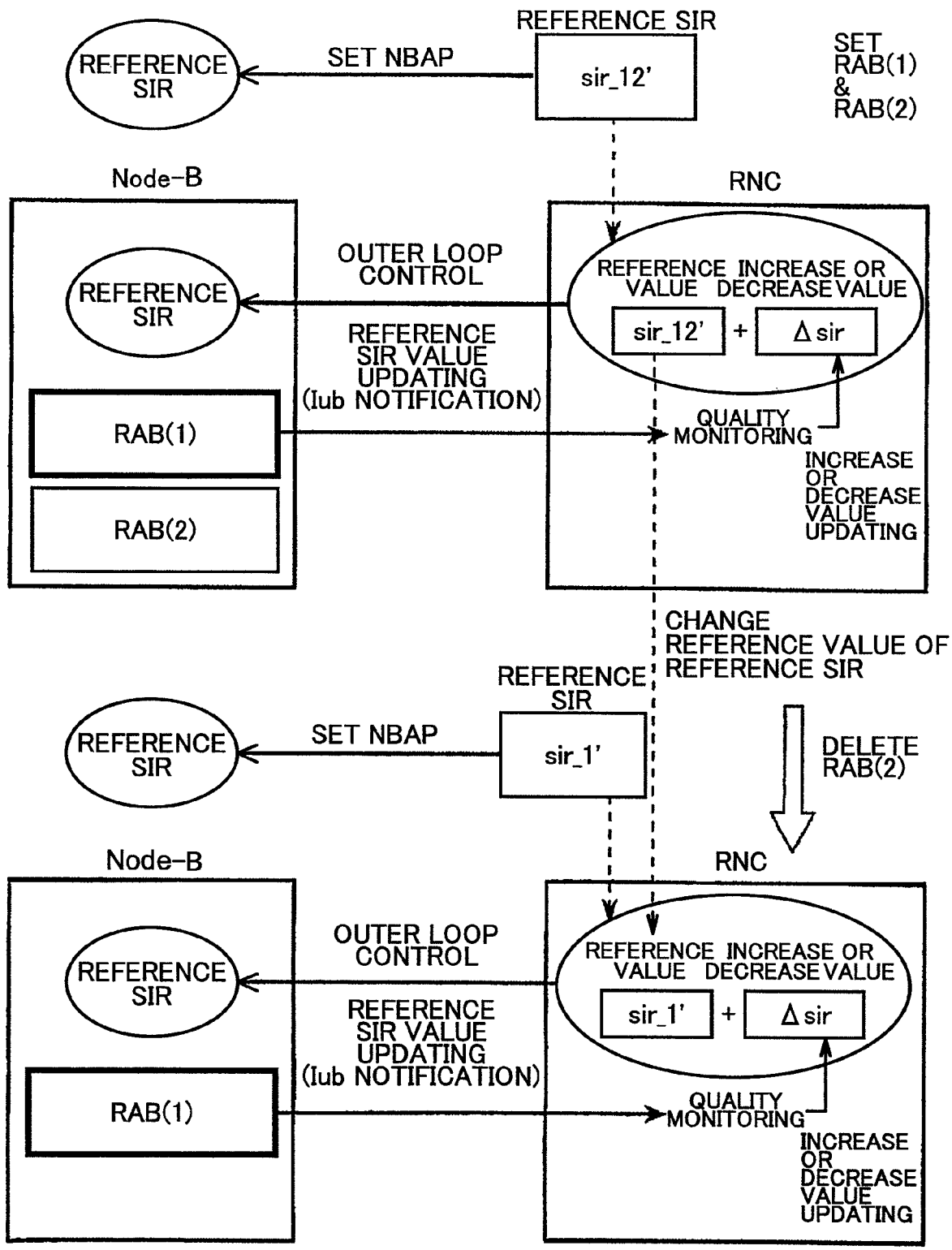
FIGS. 11A and 11B respectively are diagrams for explaining an operation and a change in SIR value with time when adding a radio access bearer (RAB) in the second embodiment of the transmission power control apparatus according to the present invention.
Figure 11B:
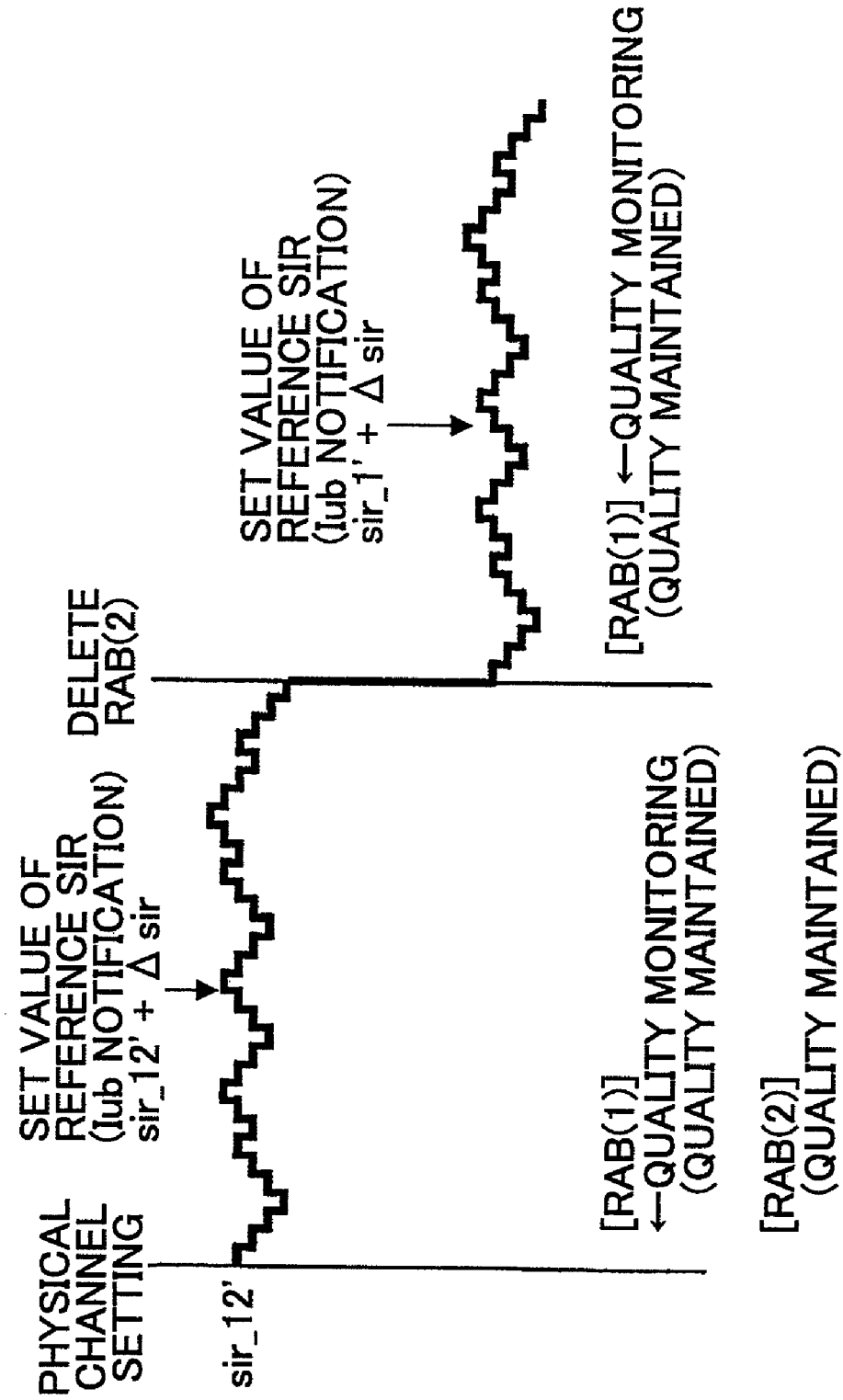

Next, a description will be given of a second embodiment of the transmission power control apparatus according to the present invention. FIGS. 10A and 10B respectively are diagrams for explaining an operation and a change in SIR value with time when adding a radio access bearer (RAB) in the second embodiment of the transmission power control apparatus according to the present invention. FIGS. 11A and 11B respectively are diagrams for explaining an operation and a change in SIR value with time when adding a radio access bearer (RAB) in the second embodiment of the transmission power control apparatus according to the present invention. This second embodiment of the transmission power control apparatus employs a second embodiment of the transmission power control method according to the present invention.

In this second embodiment, when carrying out the outer loop transmission power control, the setting of the reference SIR value is made as follows if the radio access bearer (RAB) is added or deleted. When a specific physical channel is set, it is assumed for the sake of convenience that the reference SIR value that is set by the NBAP notification is SIR_before, and the outer loop transmission power control is carried out in this state.

In the radio network control apparatus RNC, an increase or decrease (change) value $\Delta SIR$ of the reference SIR value is derived based on up-link reception quality information that is obtained from the base station apparatus Node-B. The increase or decrease value $\Delta SIR$ changes for every specific period of the outer loop transmission power control. In the radio network control apparatus RNC, SIR_before is added as a reference value every time the increase or decrease value $\Delta SIR$ is updated, and an added value (SIR_before+$\Delta SIR$) that is obtained is notified to the base station apparatus Node-B by the Iub. In the base station apparatus Node-B, the added value (SIR_before+$\Delta SIR$) is set as the reference SIR value so as to update the reference SIR value.

If an adding or detecting process is carried out to add or delete the radio access bearer (RAB) in a state where this outer loop transmission power control is continued, the reference SIR value notified by the NBAP is set to SIR_after. In the radio network control apparatus RNC, the reference value of the reference SIR value is changed from SIR_before to SIR_after, and an added value (SIR_after+$\Delta SIR$) of the reference value and the $\Delta SIR$ value is notified to the base station apparatus Node-B by the Iub every time the $\Delta SIR$ value is updated, so as to set and update the reference SIR value. The reference value of the reference SIR value is notified to the base station apparatus (Node-B) by the NBAP, and is successively updated every time the adding or deleting process is carried out with respect to the radio access bearer (RAB).

FIG. 10A shows the operation of the outer loop transmission power control before and after the adding process with respect to the radio access bearer (RAB) in this second embodiment, and FIG. 10B shows a change in the reference SIR value with time. It is assumed for the sake of convenience that the outer loop transmission power control is carried out in the physical channel to which the radio access bearer RAB(1) is mapped. When setting the physical channel, the reference SIR value is set to sir_1 by the NBAP notification, and an increase or decrease (change) value $\Delta sir$ of the reference SIR value is calculated by the outer loop transmission power control that is carried out with the radio access bearer RAB(1) as the target of the quality monitoring.

When the value of the increase or decrease value $\Delta sir$ is updated, the radio network control apparatus RNC notifies an added value (sir_1+$\Delta sir$) of the reference value sir_1 and the increase or decrease value $\Delta sir$ to the base station apparatus Node-B by the Iub. The base station apparatus Node-B updates the reference SIR value to the added value (sir_1+$\Delta sir$).

When the radio access bearer RAB(2) is added in this state, the radio network control apparatus RNC changes the reference value of the reference SIR value to sir_12 and continues the outer loop transmission power control. In addition, the radio network control apparatus RNC notifies the calculated reference SIR value (sir_12+Δsir) to the base station apparatus Node-B, so as to set and update the reference SIR value in the base station apparatus Node-B. sir_12 is the reference SIR value that is set by the NBAP when carrying out the adding process of the radio access bearer RAB(2), and sir_1<sir_12.

By setting and updating the reference SIR value in this manner, it becomes possible to carry out the outer loop transmission power control by setting the reference SIR value adaptively to the quality monitoring after the change in the radio access bearer (RAB) immediately after the adding process of the radio access bearer (RAB), and to prevent deterioration of the quality, as shown in FIG. 11B, even if the reference value sir_12 of the reference SIR value after adding the radio access bearer (RAB) is sufficiently large compared to the reference value sir_1 of the reference SIR value before adding the radio access bearer (RAB).

FIG. 11A shows the operation of the outer loop transmission power control before and after the deleting process with respect to the radio access bearer (RAB) in this second embodiment, and FIG. 11B shows a change in the reference SIR value with time. It is assumed for the sake of convenience that the outer loop transmission power control is carried out in the physical channel to which the radio access bearers RAB(1) and RAB(2) are mapped. When setting the physical channel, the reference SIR value is set to sir_12' by the NBAP notification, and an increase or decrease (change) value Δsir of the reference SIR value is calculated by the outer loop transmission power control that is carried out with the radio access bearer RAB(1) as the target of the quality monitoring.

When the value of the increase or decrease value Δsir is updated, the radio network control apparatus RNC notifies an added value (sir_12'+Δsir) of the reference value sir_12' and the increase or decrease value Δsir to the base station apparatus Node-B by the Iub. The base station apparatus Node-B updates the reference SIR value to the added value (sir_12'+ Δsir).

When the radio access bearer RAB(2) is deleted in this state, the radio network control apparatus RNC changes the reference value of the reference SIR value to sir_1' and continues the outer loop transmission power control. In addition, the radio network control apparatus RNC notifies the calculated reference SIR value (sir_1'+Δsir) to the base station apparatus Node-B, so as to set and update the reference SIR value in the base station apparatus Node-B. sir_1' is the reference SIR value that is set by the NBAP when carrying out the deleting process of the radio access bearer RAB(2), and sir_12'<sir_1'.

By setting and updating the reference SIR value in this manner, it becomes possible to carry out the outer loop transmission power control by setting the reference SIR value adaptively to the quality monitoring after the change in the radio access bearer (RAB) immediately after the deleting process of the radio access bearer (RAB), and to prevent an excessively high quality from being maintained, even if the reference value sir_1' of the reference SIR value after deleting the radio access bearer (RAB) is sufficiently small compared to the reference value sir_12' of the reference SIR value before deleting the radio access bearer (RAB).

Figure 12A:
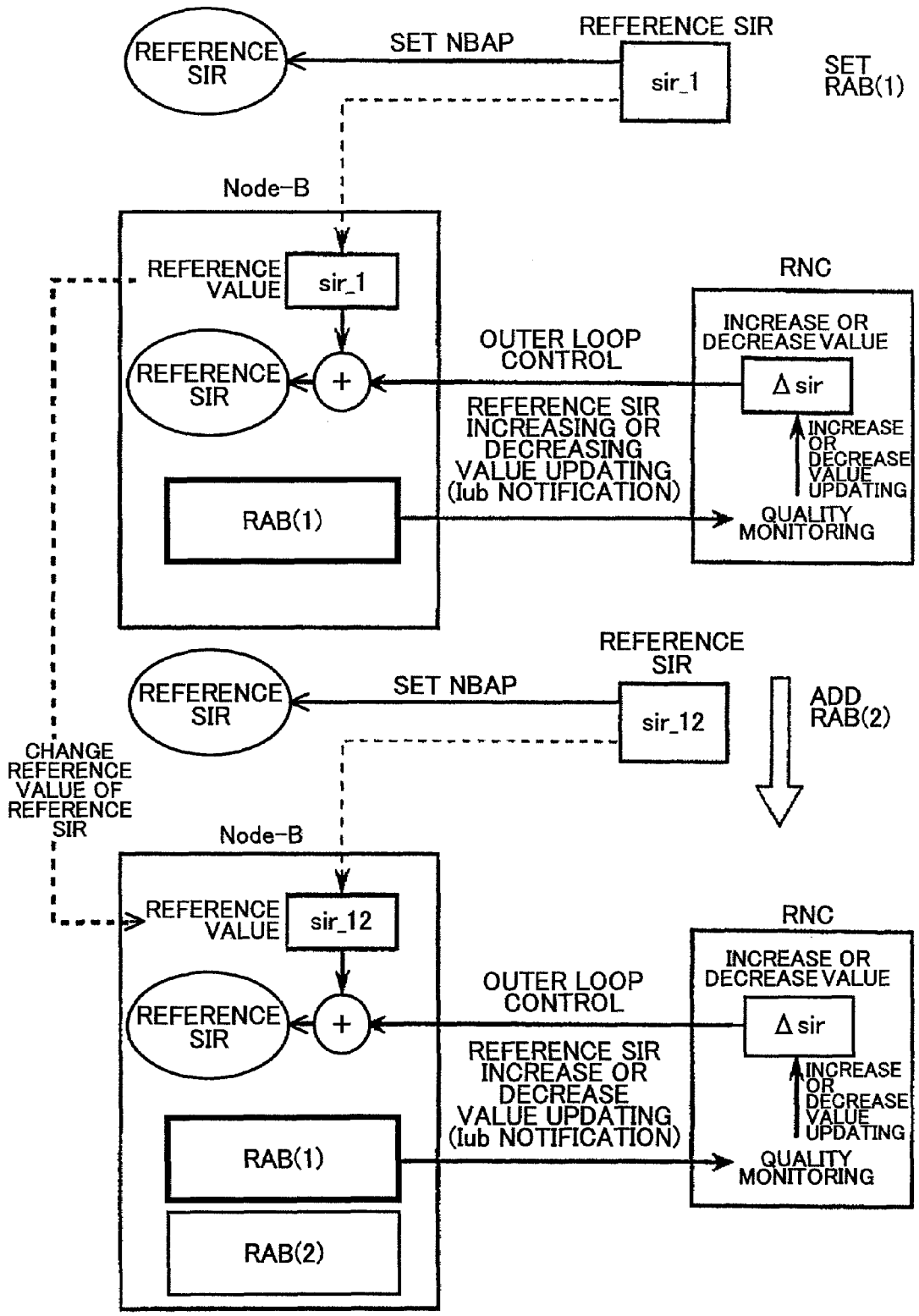
FIGS. 12A and 12B respectively are diagrams for explaining an operation and a change in SIR value with time when adding a radio access bearer (RAB) in a third embodiment of the transmission power control apparatus according to the present invention.
Figure 12B:
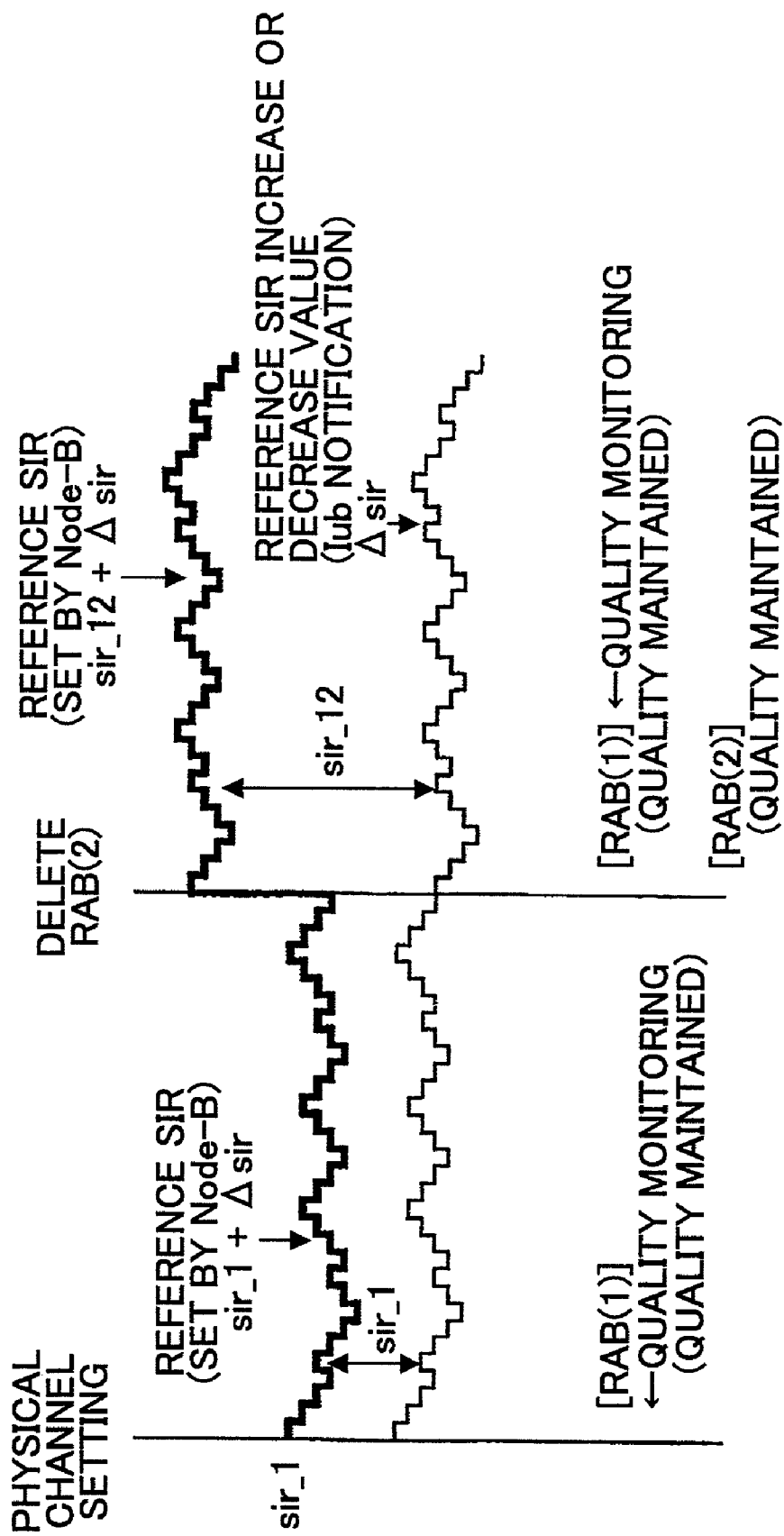
Figure 13A:
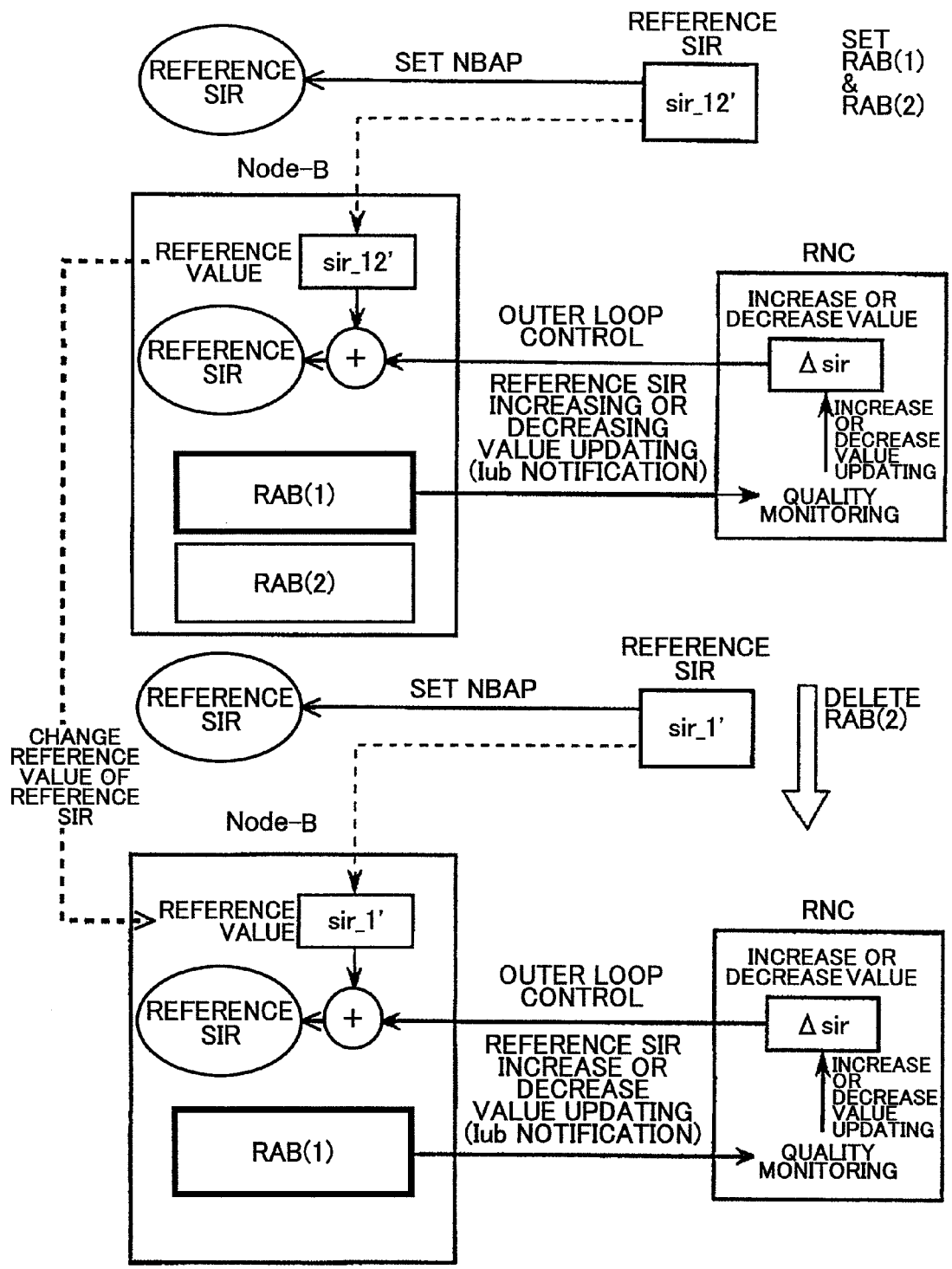
FIGS. 13A and 13B respectively are diagrams for explaining an operation and a change in SIR value with time when deleting a radio access bearer (RAB) in the third embodiment of the transmission power control apparatus according to the present invention.
Figure 13B:
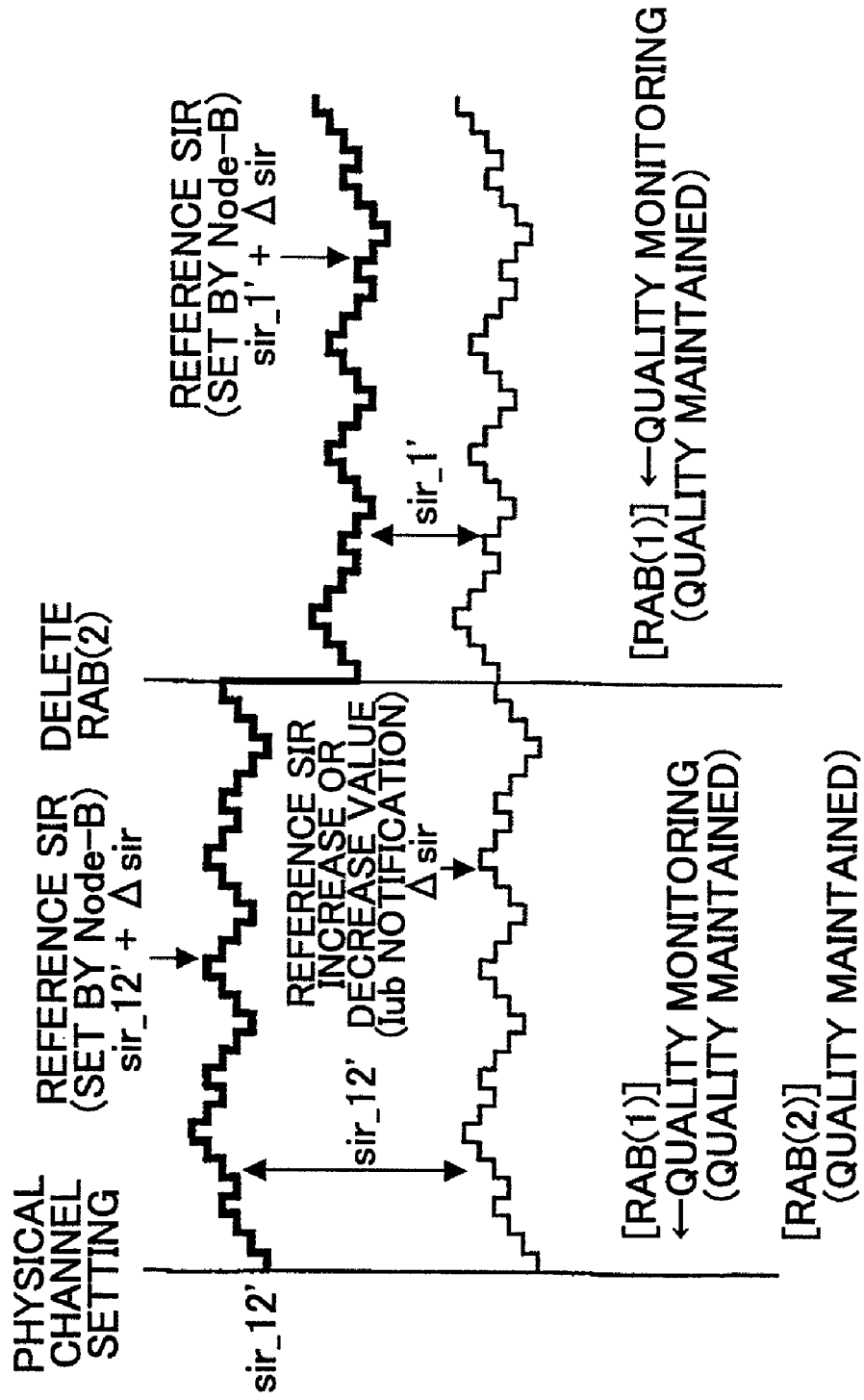

Next, a description will be given of a third embodiment of the transmission power control apparatus according to the present invention. FIGS. 12A and 12B respectively are diagrams for explaining an operation and a change in SIR value with time when adding a radio access bearer (RAB) in the third embodiment of the transmission power control apparatus according to the present invention. FIGS. 13A and 13B respectively are diagrams for explaining an operation and a change in SIR value with time when deleting a radio access bearer (RAB) in the third embodiment of the transmission power control apparatus according to the present invention. This third embodiment of the transmission power control apparatus employs a third embodiment of the transmission power control method according to the present invention.

In this third embodiment, when carrying out the outer loop transmission power control, the setting of the reference SIR value is made as follows if the radio access bearer (RAB) is added or deleted. When a specific physical channel is set, it is assumed for the sake of convenience that the reference SIR value that is set by the NBAP notification is SIR_before, and the outer loop transmission power control is carried out in this state.

In the radio network control apparatus RNC, an increase or decrease (change) value ΔSIR of the reference SIR value is derived based on up-link reception quality information that is obtained from the base station apparatus Node-B. The increase or decrease value ΔSIR changes for every specific period of the outer loop transmission power control.

The radio network control apparatus RNC notifies the increase or decrease value ΔSIR to the base station apparatus Node-B by the Iub every time the increase or decrease value ΔSIR is updated.

In the base station apparatus Node-B, SIR_before is added as a reference value to the increase or decrease value ΔSIR that is received from the radio network control apparatus RNC, and sets the reference SIR value to the added value (SIR_before+ΔSIR) so as to update the reference SIR value. If an adding or detecting process is carried out to add or delete the radio access bearer (RAB) in a state where this outer loop transmission power control is continued, it is assumed for the sake of convenience that the reference SIR value that notified by the NBAP is SIR_after.

In the base station apparatus Node-B, the reference value of the reference SIR value is changed from SIR_before to SIR_after, and every time the increase or decrease value ΔSIR is notified fro the radio network control apparatus RNC to the base station Node-B by the Iub, an added value (SIR_after+ ΔSIR) of the reference value and the ΔSIR value is calculated, so as to set and update the reference SIR value. The reference value of the reference SIR value is successively updated every time the adding or deleting process is carried out with respect to the radio access bearer (RAB) by the NBAP.

FIG. 12A shows the operation of the outer loop transmission power control before and after the adding process with respect to the radio access bearer (RAB) in this third embodiment, and FIG. 12B shows a change in the reference SIR value with time. It is assumed for the sake of convenience that the outer loop transmission power control is carried out in the physical channel to which the radio access bearer RAB(1) is mapped. When setting the physical channel, the reference SIR value is set to sir_1 by the NBAP notification, and an increase or decrease (change) value Δsir of the reference SIR value is calculated by the outer loop transmission power control that is carried out with the radio access bearer RAB(1) as the target of the quality monitoring.

When the value of the increase or decrease value Δsir is updated, the radio network control apparatus RNC notifies the increase or decrease value Δsir to the base station apparatus Node-B by the Iub. The base station apparatus Node-B updates and sets the reference SIR value to an added value (sir_1+Δsir) of the reference value sir_1 of the reference SIR value and the increase or decrease value Δsir, by adding the reference value sir_1 of the reference SIR value to the increase or decrease value Δsir that is received from the radio network control apparatus RNC.

When the radio access bearer RAB(2) is added in this state, the base station apparatus Node-B changes the reference value of the reference SIR value to sir_12, and adds the increase or decrease value Δsir notified from the radio network control apparatus RNC by the outer loop transmission power control, so as to set and update the reference SIR value to the obtained value (sir_12+Δsir). sir_12 is the reference SIR value that is set by the NBAP when carrying out the adding process of the radio access bearer RAB(2), and sir_1<sir_12.

By setting and updating the reference SIR value in this manner, it becomes possible to carry out the outer loop transmission power control by setting the reference SIR value adaptively to the quality monitoring after the change in the radio access bearer (RAB) immediately after the adding process of the radio access bearer (RAB), and to prevent deterioration of the quality, as shown in FIG. 12B, even if the reference value sir_12 of the reference SIR value after adding the radio access bearer (RAB) is sufficiently large compared to the reference value sir_1 of the reference SIR value before adding the radio access bearer (RAB).

FIG. 13A shows the operation of the outer loop transmission power control before and after the deleting process with respect to the radio access bearer (RAB) in this third embodiment, and FIG. 13B shows a change in the reference SIR value with time. It is assumed for the sake of convenience that the outer loop transmission power control is carried out in the physical channel to which the radio access bearers RAB(1) and RAB(2) are mapped. When setting the physical channel, the reference SIR value is set to sir_12' by the NBAP notification, and an increase or decrease (change) value Δsir of the reference SIR value is calculated by the outer loop transmission power control that is carried out with the radio access bearer RAB(1) as the target of the quality monitoring.

When the value of the increase or decrease value Δsir is updated, the radio network control apparatus RNC notifies the increase or decrease value Δsir to the base station apparatus Node-B by the Iub. The base station apparatus Node-B adds a reference value sir_12' of the reference SIR value to the increase or decrease value Δsir that is received from the radio network control apparatus RNC, and sets and updates the reference SIR value to the added value (sir_12'+Δsir).

When the radio access bearer RAB(2) is deleted in this state, the base station apparatus Node-B changes the reference value of the reference SIR value to sir_1' and adds the increase or decrease value Δsir that is notified from the radio network control apparatus RNC by the outer loop transmission power control, to set and update the reference SIR value to the added value (sir_1'+Δsir). sir_1' is the reference SIR value that is set by the NBAP when carrying out the deleting process of the radio access bearer RAB(2), and sir_12'<sir_1'.

By setting and updating the reference SIR value in this manner, it becomes possible to carry out the outer loop transmission power control by setting the reference SIR value adaptively to the quality monitoring after the change in the radio access bearer (RAB) immediately after the deleting process of the radio access bearer (RAB), and to prevent an excessively high quality from being maintained, even if the reference value sir_1' of the reference SIR value after deleting the radio access bearer (RAB) is sufficiently small compared to the reference value sir_12' of the reference SIR value before deleting the radio access bearer (RAB).

Further, the present invention is not limited to these embodiments, but various variations and modifications may be made without departing from the scope of the present invention.

What is claimed is:

1. A transmission power control apparatus which is coupled to and controls a base station apparatus, said transmission power control apparatus comprising:
   a calculating part configured to calculate an increase or decrease value of a reference Signal-power-to-Interference-power Ratio (SIR) value, which controls a transmission power of a mobile terminal equipment, for an inner loop transmission power control based on reception quality information;
   an updating part configured to update a reference value of the reference SIR value when adding or deleting a radio access bearer;
   an adding part configured to add the increase or decrease value to the updated reference value of the reference SIR value; and
   a notifying part configured to notify an added value of the reference value and the increase or decrease value to the base station apparatus as a set value of the reference SIR value,
   wherein the reference SIR value is controlled based on a reception quality of a plurality of radio access bearers at the base station apparatus, with respect to a physical channel to which the plurality of radio access bearers are mapped, when making a radio connection between the mobile terminal equipment and the base station apparatus in a mobile communication system, and
   a transmission power control is carried out by setting the reference SIR value based on an updated reference value when adding or deleting the radio access bearer.

2. A transmission power control apparatus which is coupled to and controls a base station apparatus, said transmission power control apparatus comprising:
   a calculating part configured to calculate an increase or decrease value of a reference Signal-power-to-Interference-power Ratio (SIR) value, which controls a transmission power of a mobile terminal equipment, for an inner loop transmission power control based on reception quality information;
   an updating part configured to update a reference value of the reference SIR value when adding or deleting a radio access bearer; and
   a notifying part configured to notify an updated reference value to the base station apparatus,
   wherein the reference SIR value is controlled based on a reception quality of a plurality of radio access bearers at the base station apparatus, with respect to a physical channel to which the plurality of radio access bearers are mapped, when making a radio connection between the mobile terminal equipment and the base station apparatus in a mobile communication system, and
   the base station apparatus sets an added value of the increase or decrease value and the reference value notified from a radio network control apparatus which controls the base station apparatus, as the reference SIR value, and carries out a transmission power control by setting the reference SIR value based on the updated reference value when adding or deleting the radio access bearer.

3. A transmission power control method for controlling a reference Signal-power-to-Interference-power Ratio (SIR) value for controlling a transmission power of a mobile terminal equipment based on a reception quality of a plurality of radio access bearers at a base station apparatus, with respect to a physical channel to which the plurality of radio access bearers are mapped, when making a radio connection between the mobile terminal equipment and the base station apparatus in a mobile communication system, said transmission power control method comprising:

calculating an increase or decrease value of the reference SIR value for an inner loop transmission power control based on reception quality information;

updating a reference value of the reference SIR value when adding or deleting a radio access bearer;

adding the increase or decrease value to the updated reference value of the reference SIR value; and notifying an added value of the reference value and the increase or decrease value to the base station apparatus as a set value of the reference SIR value, wherein said calculating, said updating, said adding and said notifying are carried out by a radio network control apparatus which is coupled to and controls the base station apparatus, and a transmission power control is carried out by setting the reference SIR value based on an updated reference value when adding or deleting the radio access bearer.

4. A transmission power control method for controlling a reference Signal-power-to-Interference-power Ratio (SIR) value for controlling a transmission power of a mobile terminal equipment based on a reception quality of a plurality of radio access bearers at a base station apparatus, with respect to a physical channel to which the plurality of radio access bearers are mapped, when making a radio connection between the mobile terminal equipment and the base station apparatus in a mobile communication system, said transmission power control method comprising:

calculating an increase or decrease value of the reference SIR value for an inner loop transmission power control based on reception quality information;

updating a reference value of the reference SIR value when adding or deleting a radio access bearer; and notifying an updated reference value to the base station apparatus, wherein said calculating, said updating and said notifying are carried out by a radio network control apparatus which is coupled to and controls the base station apparatus, and the base station apparatus sets an added value of the increase or decrease value and the reference value notified from a radio network apparatus as the reference SIR value, and carries out a transmission power control by setting the reference SIR value based on the updated reference value when adding or deleting the radio access bearer.

\* \* \* \* \*